United States Patent
Brody et al.

(10) Patent No.: US 9,767,449 B2
(45) Date of Patent: Sep. 19, 2017

(54) SYSTEM AND METHOD FOR DETECTING A SUSPICIOUS TRANSACTION

(71) Applicant: Payfone, Inc., New York, NY (US)

(72) Inventors: Michael Brody, New York, NY (US); Rodger Desai, Piscataway, NJ (US); Sung Kim, Fort Lee, NJ (US)

(73) Assignee: Payfone, Inc., New York, NY (US)

( * ) Notice: Subject to any disclaimer, the term of this patent is extended or adjusted under 35 U.S.C. 154(b) by 650 days.

(21) Appl. No.: 14/267,878

(22) Filed: May 1, 2014

(65) Prior Publication Data

US 2014/0358785 A1 Dec. 4, 2014

Related U.S. Application Data

(63) Continuation of application No. 14/098,401, filed on Dec. 5, 2013, and a continuation of application No.
(Continued)

(51) Int. Cl.
*G06Q 30/00* (2012.01)
*G06Q 20/32* (2012.01)
(Continued)

(52) U.S. Cl.
CPC ..... *G06Q 20/3224* (2013.01); *G06Q 20/0655* (2013.01); *G06Q 20/12* (2013.01);
(Continued)

(58) Field of Classification Search
CPC .......................................... G06C 30/06–30/08
(Continued)

(56) References Cited

U.S. PATENT DOCUMENTS 6,049,712 A * 4/2000 Wallinder ............. H04M 3/382
379/283
8,606,640 B2 10/2013 Brody
(Continued)

FOREIGN PATENT DOCUMENTS

EP 1-197-928 4/2002
KR 10-1006-0077541 7/2006
(Continued)

OTHER PUBLICATIONS

Carr, Mahil, Mobile Payment Systems and Services: An Introduction, IDRBT, Hyberarbad.
(Continued)

*Primary Examiner* — Ethan D Civan
(74) *Attorney, Agent, or Firm* — Berkeley Law & Technology Group, LLP

(57) ABSTRACT

Briefly, in accordance with one embodiment, a home country associated with a current mobile telephone number for a mobile subscriber is identified. Other countries, such as the following are also identified: a country in which the mobile subscriber is using the internet; a country in which the mobile subscriber is roaming, is operating a current mobile telephone associated with the mobile subscriber's mobile provider account or is operating a current mobile telephone having a SIM card associated with the mobile subscriber's mobile account; a country in which a merchant for a transaction is located; and/or a country in which goods in the transaction, if any, are being shipped. The countries are compared and scoring is employed to facilitate identification of a suspicious transaction.

16 Claims, 7 Drawing Sheets

Related U.S. Application Data

14/098,393, filed on Dec. 5, 2013, said application No. 14/098,401 is a continuation of application No. 12/804,438, filed on Jul. 20, 2010, now Pat. No. 8,606,640, said application No. 14/098,393 is a continuation of application No. 12/804,438, filed on Jul. 20, 2001, now Pat. No. 8,606,640, which is a continuation-in-part of application No. 12/583,151, filed on Aug. 14, 2009, now abandoned.

(60) Provisional application No. 61/281,892, filed on Nov. 23, 2009, provisional application No. 61/088,839, filed on Aug. 14, 2008.

(51) Int. Cl.

| | |
|---|---|
| *G06Q 20/06* | (2012.01) |
| *G06Q 20/16* | (2012.01) |
| *G06Q 20/26* | (2012.01) |
| *G06Q 20/28* | (2012.01) |
| *G06Q 20/34* | (2012.01) |
| *G06Q 30/06* | (2012.01) |
| *H04M 15/00* | (2006.01) |
| *H04M 17/00* | (2006.01) |
| *H04W 4/24* | (2009.01) |
| *G06Q 20/40* | (2012.01) |
| *G06Q 20/12* | (2012.01) |

(52) U.S. Cl.
CPC .............. *G06Q 20/16* (2013.01); *G06Q 20/26* (2013.01); *G06Q 20/28* (2013.01); *G06Q 20/32* (2013.01); *G06Q 20/3226* (2013.01); *G06Q 20/3229* (2013.01); *G06Q 20/349* (2013.01); *G06Q 20/4016* (2013.01); *G06Q 30/0613* (2013.01); *H04M 15/00* (2013.01); *H04M 15/68* (2013.01); *H04M 17/103* (2013.01); *H04M 17/20* (2013.01); *H04W 4/24* (2013.01); *H04M 2017/12* (2013.01); *H04M 2215/0196* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 2001/0037254 A1 | 11/2001 | Glikman | |
| 2002/0052754 A1 | 5/2002 | Joyce et al. | |
| 2002/0143634 A1 | 10/2002 | Kumar et al. | |
| 2003/0212601 A1 | 11/2003 | Silva et al. | |
| 2004/0143545 A1 | 7/2004 | Kulakowski | |
| 2004/0243477 A1 | 12/2004 | Mathai et al. | |
| 2005/0075945 A1* | 4/2005 | Hodge | G06Q 30/02 705/26.8 |
| 2005/0114020 A1 | 5/2005 | Seto et al. | |
| 2006/0224470 A1* | 10/2006 | Garcia Ruano | G06Q 20/04 705/26.1 |
| 2007/0027803 A1 | 2/2007 | Brandes et al. | |
| 2007/0043664 A1 | 2/2007 | Wilkes | |
| 2007/0055623 A1 | 3/2007 | Ha et al. | |
| 2007/0288377 A1 | 12/2007 | Shaked | |
| 2007/0299728 A1 | 12/2007 | Nemirofsky et al. | |
| 2007/0299773 A1 | 12/2007 | Soderstrom | |
| 2008/0125117 A1 | 5/2008 | Jiang | |
| 2008/0126261 A1 | 5/2008 | Lovett | |
| 2008/0139171 A1 | 6/2008 | Bernath | |
| 2008/0140548 A1 | 6/2008 | Csoka | |
| 2010/0235276 A1 | 9/2010 | Smith | |

FOREIGN PATENT DOCUMENTS

| | | |
|---|---|---|
| KR | 10-2007-0121618 | 12/2007 |
| KR | 10-2008-0003760 | 1/2008 |
| KR | 10-2008-0009671 | 1/2008 |

OTHER PUBLICATIONS

Petrova, Krassie, *Mobile Payment: Towards a Customer-centric Model*, Auckland University of Technology, Auckland, New Zealand.

Rahimian, Vahid and Habibi, Jafar *MPaySmart: A Customer Centric Approach in Offering Efficient Mobile Payment Services*, Department of Computer Engineering, Sharif University of Technology, Tehran, Iran.

Schwartz, Susana, *Standards Watch: Simpay: Reaching an Untapped Market*, Dec. 1, 2004, B/OSS: Billing & OSS World, http://vpico.com/articlemanager/printerfriendly.aspx?article=158968.

Soghoian, Christopher, and Aad, Imad, *Merx: Secure and Privacy Preserving Delegated Payments*, Berkman Center for Internet and Society, Harvard University, USA.

U.S. Appl. No. 12/583,151, filed Aug. 14, 2009, 100 Pages.

U.S. Appl. No. 12/583,151: Notice to File Missing Parts, Filing Receipt, dated Sep. 2, 2009, 5 Pages.

U.S. Appl. No. 12/583,151: Applicant Response to Pre-Exam Formalities Notice, dated Nov. 2, 2009, 7 Pages.

U.S. Appl. No. 12/583,151: Filing Receipt, dated Nov. 16, 2009, 3 Pages.

U.S. Appl. No. 12/583,151: Request for Corrected Filing Receipt, dated Dec. 10, 2009, 4 Pages.

U.S. Appl. No. 12/583,151: Filing Receipt, dated Dec. 22, 2009, 3 Pages.

U.S. Appl. No. 12/583,151: Non-Final Office Action, dated Jul. 15, 2010, 14 Pages.

U.S. Appl. No. 12/583,151: Preliminary Amendment, dated Jul. 19, 2010, 25 Pages.

U.S. Appl. No. 12/583,151: Rescind Nonpublication Request for Pre Grant Pub, dated Jul. 26, 2010, 1 Page.

U.S. Appl. No. 12/583,151: Non-Final Office Action Response, dated Nov. 15, 2010, 17 Pages.

U.S. Appl. No. 12/583,151: Notice of Publication, dated Nov. 18, 2010, 1 Page.

U.S. Appl. No. 12/583,151: Final Office Action, dated Jan. 28, 2011, 14 Pages.

U.S. Appl. No. 12/583,151: Response After Final Action, dated Apr. 1, 2011, 20 Pages.

U.S. Appl. No. 12/583,151: Advisory Action (PTOL-303), dated Apr. 15, 2011, 14 Pages.

U.S. Appl. No. 12/583,151: Non-Final Office Action Response, dated May 3, 2011, 17 Pages.

U.S. Appl. No. 12/583,151: Advisory Action (PTOL-303), dated May 31, 2011, 3 Pages.

U.S. Appl. No. 12/583,151: Notice of Appeal dated Jun. 3, 2011, 3 Pages.

U.S. Appl. No. 12/583,151: Request for Continued Examination, dated Aug. 1, 2011, 15 Pages.

U.S. Appl. No. 12/583,151: Documents Submitted with 371 Applications, dated Oct. 7, 2011, 9 Pages.

U.S. Appl. No. 12/583,151: Non-Final Office Action, dated May 29, 2014, 15 Pages.

U.S. Appl. No. 12/804,438, filed Jul. 20, 2010, 105 Pages.

U.S. Appl. No. 12/804,438: Filing Receipt, Notice to File Missing Parts, dated Aug. 30, 2010, 56 Pages.

U.S. Appl. No. 12/804,438: Applicant Response to Pre-Exam Formalities Notice, dated Oct. 25, 2010, 9 Pages.

U.S. Appl. No. 12/804,438: Filing Receipt, dated Nov. 12, 2010, 3 Pages.

U.S. Appl. No. 12/804,438: Notice of Publication, dated Feb. 24, 2011, 1 Page.

U.S. Appl. No. 12/804,438: Documents Submitted with 371 Applications, dated Apr. 28, 2011, 8 Pages.

(56) References Cited

OTHER PUBLICATIONS

U.S. Appl. No. 12/804,438: Non-Final Office Action, dated Sep. 22, 2011, 14 Pages.
U.S. Appl. No. 12/804,438: Documents Submitted with 371 Applications, dated Oct. 7, 2011, 9 Pages.
U.S. Appl. No. 12/804,438: Non-Final Office Action Response, dated Mar. 27, 2012, 21 Pages.
U.S. Appl. No. 12/804,438: Final Office Action, dated Jun. 11, 2012, 16 Pages.
U.S. Appl. No. 12/804,438: Response After Final Action, dated Aug. 13, 2012, 22 pages.
U.S. Appl. No. 12/804,438: Advisory Action (PTOL-303), dated Aug. 29, 2012, 3 Pages.
U.S. Appl. No. 12/804,438: Notice of Appeal dated Sep. 11, 2012, 1 Page.
U.S. Appl. No. 12/804,438: Response After Final Action, Appeal Brief dated Nov. 19, 2012, 37 Pages.
U.S. Appl. No. 12/804,438: Examiner's Answer to Appeal Brief, dated Feb. 21, 2013, 11 Pages.
U.S. Appl. No. 12/804,438: Appeal Docketing Notice, dated May 31, 2013, 2 Pages.
U.S. Appl. No. 12/804,438: Request for Continued Examination (RCE), dated Sep. 10, 2013, 18 Pages.
U.S. Appl. No. 12/804,438: Dismissal of Appeal, dated Sep. 16, 2013, 2 Pages.
U.S. Appl. No. 12/804,438: Notice of Allowance and Fees Due (PTOL-85), dated Oct. 9, 2013, 7 Pages.
U.S. Appl. No. 12/804,438: Amendment after Notice of Allowance (Rule 312), Issue Fee Payment (PTO-85B), dated Oct. 29, 2013, 11 Pages.
U.S. Appl. No. 12/804,438: Response to Amendment under Rule 312, dated Nov. 8, 2013, 2 Pag.
U.S. Appl. No. 12/804,438: Issue Notification, dated Nov. 20, 2013, 1 Page.
U.S. Appl. No. 14/098,393, filed Dec. 15, 2013, 106 Pages.
U.S. Appl. No. 14/098,393: Preliminary Amendment, dated Dec. 10, 2013, 11 Pages.
U.S. Appl. No. 14/098,393: Filing receipt, Notice to File Missing Parts dated Dec. 24, 2013, 5 Pages.
U.S. Appl. No. 14/098,393: Applicant Response to Pre-Exam Formalities Notice, dated Feb. 24, 2014, 5 Pages.
U.S. Appl. No. 14/098,393: Filing Receipt, dated Mar. 7, 2014, 3 Pages.
U.S. Appl. No. 14/098,393: Notice of publication, dated Jun. 19, 2014, 1 page.
U.S. Appl. No. 14/098,393: Application Data Sheet, dated Sep. 4, 2014, 6 pages.
U.S. Appl. No. 14/098,401, filed Dec. 5, 2013, 106 Pages.
U.S. Appl. No. 14/098,401: Preliminary Amendment, dated Dec. 10, 2013, 10 Pages.
U.S. Appl. No. 14/098,401: Notice to File Missing Parts, dated Dec. 26, 2013, 5 Pages.
U.S. Appl. No. 14/098,401: Applicant Response to Pre-Exam Formalities Notice, dated Feb. 24, 2014, 5 Pages.
U.S. Appl. No. 14/098,401: Filing Receipt, dated Mar. 7, 2014, 3 Pages.
U.S. Appl. No. 14/098,401: Notice of Publication, dated Jun. 19, 2014, 1 page.
U.S. Appl. No. 14/098,401: : Application Data Sheet, dated Sep. 4, 2014, 6 pages.
PCT/US2010/002043: Application as filed, dated Jul. 20, 2010, 76 pages.
PCT/US2010/002043: Written Opinion, dated Jan. 24, 2011, 5 pages.
PCT/US2010/002043: International Preliminary report on Patentability, dated Feb. 14, 2012, 6 pages.
PCT/US2010/002043: ISR dated Jul. 20, 2010, 3 pages.
PCT/US2010/003027: Application as filed, dated Jul. 20, 2010, 54 pages.
PCT/US2010/003027: Written Opinion, dated Jun. 23, 2011, 4 pages.
PCT/US2010/003027: Publication, dated May 26, 2011, 54 pages.
PCT/US2010/003027: International Preliminary report on Patentability, dated May 30, 2012, 5 pages.
PCTCA 2774713 Application dated Jul. 20, 2010, 79 pages.
EP2010808435: Claim amendments filed in EU application, dated Oct. 15, 2012, 11 pages.
WIPO, International Search Report, dated Nov. 23, 2011, Korea.
WIPO, Written Opinion of the International Searching Authority, dated Nov. 23, 2011, Korea.
U.S. Appl. No. 14/098,393: Non-Final Rejection, Aug. 23, 2016, 13 pages.
U.S. Appl. No. 14/098,401: Non-Final Rejection, Aug. 24, 2016, 13 pages.
U.S. Appl. No. 14/518,765: Notice of Publication, Apr. 21, 2016, 1 page.
U.S. Appl. No. 12/583,151: Abandonment Dec. 5, 2014, 2 pages.
U.S. Appl. No. 13/373,069, filed Nov. 3, 2011, 65 pages.
U.S. Appl. No. 13/373,069: Notice to File Missing Parts, dated Nov. 21, 2011, 2 pages.
U.S. Appl. No. 13/373,069: Filing Receipt, dated Nov. 21, 2011, 3 pages.
U.S. Appl. No. 13/373,069: Filing Receipt Apr. 30, 2012, 3 pages.
U.S. Appl. No. 13/373,069: Notice of Publication, dated Aug. 9, 2012, 1 page.
U.S. Appl. No. 13/373,069: Non Final Rejection and Examiner Search, dated Dec. 1, 2014, 12 pages.
U.S. Appl. No. 14/518,765, filed Oct. 20, 2014, 81 pages.
U.S. Appl. No. 14/518,765: Filing Receipt, dated Oct. 27, 2014, 3 pages.
WIPO, International Search Report, dated Jun. 26, 2012, Korea.
WIPO, Written Opinion of the International Searching Authority, dated Jun. 26, 2012, Korea.
U.S. Appl. No. 14/098,393: Amendment/Req. Reconsideration After Non-Final Reject, Nov. 23, 2016, 47 pages.
U.S. Appl. No. 14/098,401: Amendment/Req. Reconsideration After Non-Final Reject, Nov. 23, 2016, 46 pages.
U.S. Appl. No. 14/098,393: Final Rejection, Jan. 6, 2017, 16 pages.
U.S. Appl. No. 14/098,401: Final Rejection, Jan. 5, 2017, 13 pages.
U.S. Appl. No. 14/098,401: RCE and Amendments, Apr. 5, 2017, 19 pages.
U.S. Appl. No. 14/098,401: Applicant Initiated Interview Summary and Office Action Appendix, Apr. 7, 2017, 4 pages.
U.S. Appl. No. 14/098,401: Notice of Allowance and Fees Due, Apr. 28, 2017, 8 pages.
U.S. Appl. No. 14/098,393, Final Rejection, dated Jan. 6, 2017, 16 pages.
U.S. Appl. No. 14/098,401 Final Rejection, dated Jan. 5, 2017, 13 pages.
U.S. Appl. No. 14/098,401 RCE and Amendments, dated Apr. 5, 2017, 19 pages.
U.S. Appl. No. 14/098,401 Applicant Initiated Interview Summary and Office Action Appendix, dated Apr. 7, 2017, 4 pages.
U.S. Appl. No. 14/098,401 Notice of Allowance and Fees Due, dated Apr. 28, 2017, 8 pages.
U.S. Appl. No. 14/098,393 RCE and Amendments, dated Jun. 6, 2017, 40 pages.
U.S. Appl. No. 14/098,393 Notice of Allowance and Fees Due, dated Jun. 28, 2017, 8 pages.
U.S. Appl. No. 14/098,401 Issue Fee Payment, May 11, 2017, 1 page.
U.S. Appl. No. 14/098,401 Electric Terminal Disclaimer, May 11, 2017, 3 pages.
U.S. Appl. No. 14/098,401 Issue Notification, dated May 24, 2017, 1 page.
U.S. Appl. No. 14/518,765 Non-Final Rejection, dated May 17, 2017, 20 pages.
U.S. Appl. No. 14/518,765 Amendment/Req. Reconsideration-After Non-Final Reject, dated Jun. 9, 2017, 22 pages.

* cited by examiner

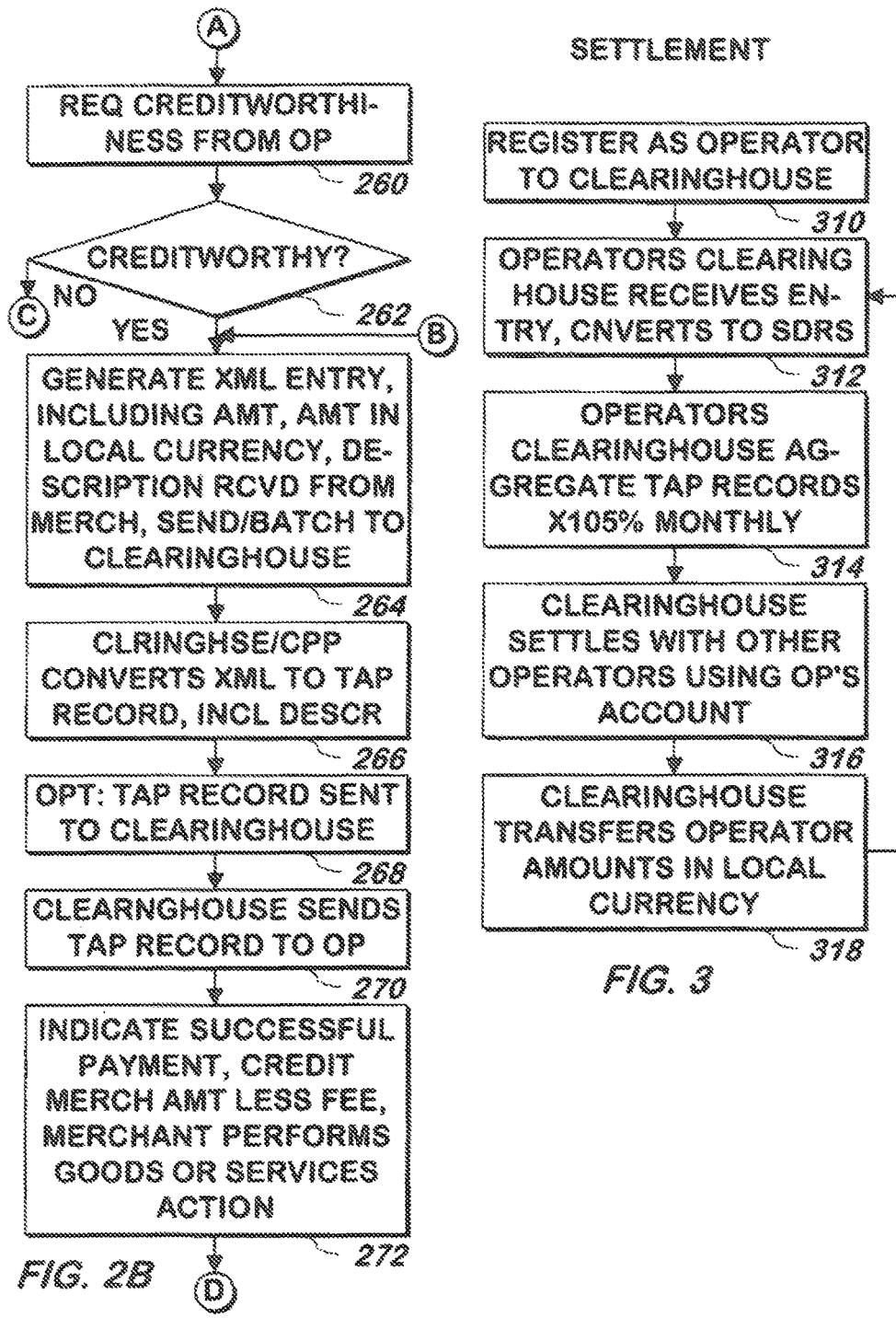

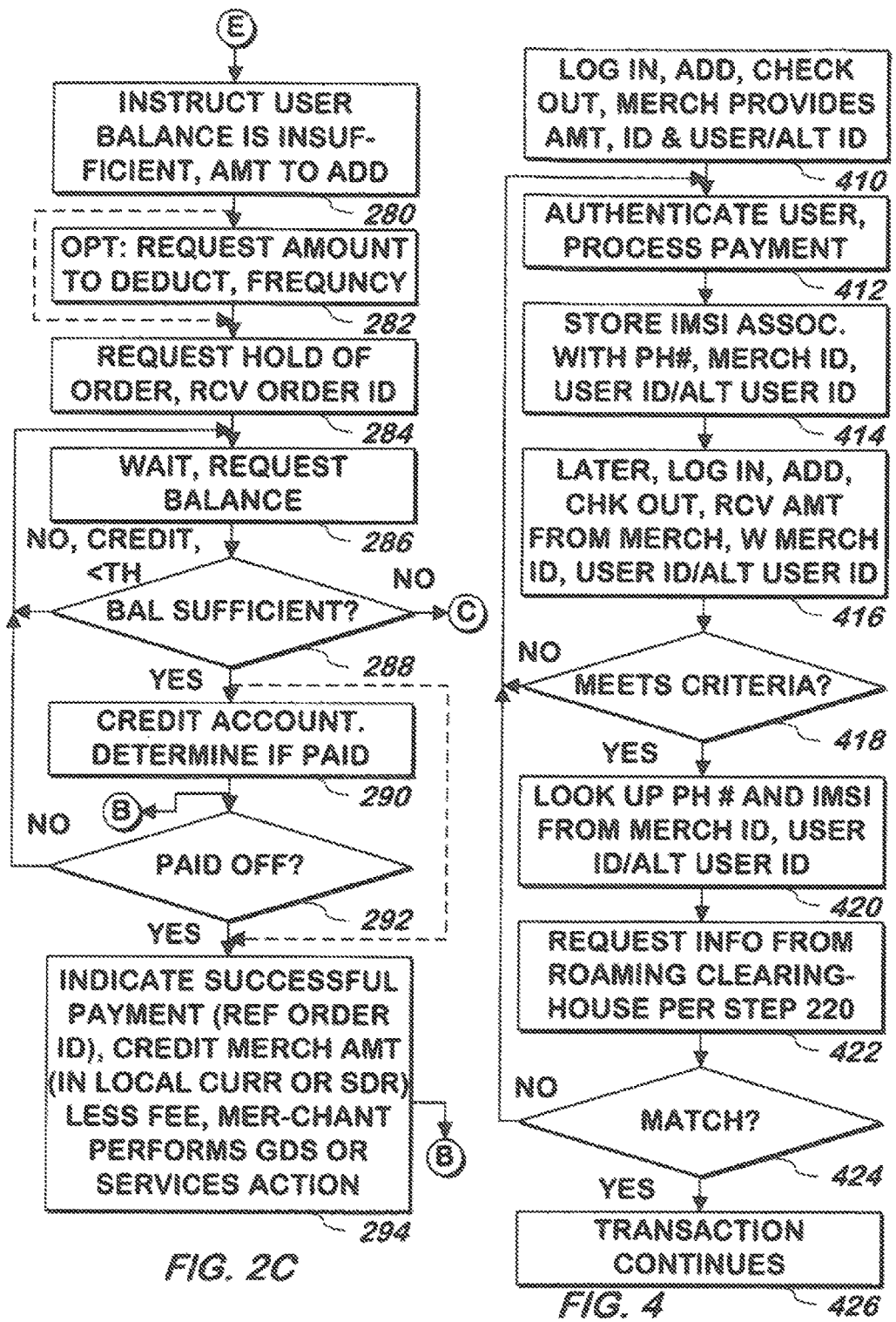

SYSTEM AND METHOD FOR DETECTING A SUSPICIOUS TRANSACTION

CROSS REFERENCE TO RELATED APPLICATION

This application claims the benefit of U.S. patent application Ser. No. 61/281,892, entitled, "Method and Apparatus for Paying a Merchant Using a Cellular Telephone Account" filed by Michael Brody on Nov. 23, 2009 and is a continuation in part of U.S. patent application Ser. No. 12/583,151, entitled "System and Method for Paying a Merchant Using A Cellular Telephone Account" Filed by Michael Brody, Roger Desai, and Sung Kim on Aug. 14, 2009, which claims the benefit of U.S. Provisional Application Ser. No. 61/088,839 Entitled, "System for Enabling Mobile-Based Financial Transactions and Methods Thereof" Filed by Roger Desai on Aug. 14, 2008, each having the same assignee as the present application, and each is hereby incorporated by reference in its entirety.

FIELD OF THE INVENTION

The present invention is related to computer software and more specifically to computer software for payment processing.

BACKGROUND OF THE INVENTION

It can be desirable to pay for items ordered online using a cellular telephone account. The account may be either a prepaid account, in which money is deposited in the account prior to purchasing goods or services with that account, or a postpaid account, in which credit is extended to the account holder for goods and services, usually to be paid by the end of the month.

Conventional solutions involve the user using a cell phone to dial a number or sending an SMS text message to a short code (a shorter string of digits with which an SMS text message may be addressed), which then is charged against the user's cellular telephone account using conventional methods. The number or short code corresponds to a fixed amount that will be charged to the user's cellular telephone account, similar to a 976 call.

Although this arrangement can be used for purchasing discrete products such as a soda from a vending machine, it does not provide the level of flexibility to use for purchasing from online merchants selling different-priced goods or services. It would be possible to use multiples of each of several possible amounts by dialing the various combinations of messages or sending the various combinations of SMS text messages to reach a desired amount, but such operation is cumbersome, and SMS messages are not fully reliable, making this arrangement more difficult to use.

What is needed is a system and method that can charge a flexible amount to a user's prepaid or postpaid cellular telephone account, such as when ordering goods or services from an online merchant.

SUMMARY OF INVENTION

An operator of some or all of the system and method, referred to as a cell phone payment processor, registers with cellular telephone operators and/or clearinghouses as a cellular telephone service roaming provider. The system and method then receives a request from a merchant, such as an online merchant, to pay for goods or services the holder of the cellular telephone is in the process of ordering. The merchant or the user supplies the user's cellular telephone number to the system and method. The user is validated, the transaction is checked for fraud or unacceptably high number of returns, their status as a prepaid account or one that will be postpaid is identified, and the user's account status and other information is determined and validated, including identifying the IMSI, a code associated with the SIM card that is used to operate the cellular telephone. If the cell phone account is a prepaid account, a determination is made as to whether the balance is sufficient for the amount to be charged, plus any additional amount required by the cell phone service provider. If so, the amount is charged to that account by an operator of the system and method in the manner of a roaming service provider. If the user is postpaid, the account is charged also in the manner of a roaming service provider, and a description of the transaction is provided to the user's carrier, optionally via a clearinghouse. The merchant is informed of the payment, and then the merchant provides the goods or services ordered, for example, by shipping them from one location to another, or providing goods or services electronically over a network, or by taking an action, potentially having a physical effect, that causes a service to be provided.

In one embodiment, if the user does not have a sufficient balance in a prepaid cell phone account, the system and method asks the user to deposit more funds in the account, informs the merchant that the transaction should be held, and, when the balance is fully paid, informs the merchant that payment has been received. The merchant then provides the goods or services as described herein. If desired, a layaway plan may be set up that takes multiple payments from the user's cell phone account until the amount of the transaction is paid in full, at which point, the merchant is informed that payment has been provided and the merchant then provides the goods or services as described herein.

The user may use their cell phone account to purchase, or add value to, a prepaid debit card using the system and method of the present invention if the merchant does not offer payment by cell phone. The user may then use the prepaid debit card at any merchant or online merchant that accepts them. The user may instead receive a debit card or credit card that is paid for using their cell phone account when any charges are made to the card. The user need not receive a physical card, but may instead receive information that would be on the card, such as card number, expiration date and a three digit code.

In one embodiment, when a user uses the system and method with a trusted merchant, if the user is registered with that merchant and has been authenticated to the system and method when the user previously used the system and method with the trusted merchant, the user may be afforded privileges, such as less or no authentication, or less or no verification of account balance or good standing of their account.

In one embodiment, the no merchant is involved, as a subscriber takes the place of a merchant to transfer money to a different subscriber.

BRIEF DESCRIPTION OF THE DRAWINGS

FIG. 3 is a method of settling cellular telephone roaming charges according to one embodiment of the present invention.

FIG. 4 is a method of integrating a registration process into the charging method of FIG. 2.

DETAILED DESCRIPTION OF A PREFERRED EMBODIMENT

Figure 1:
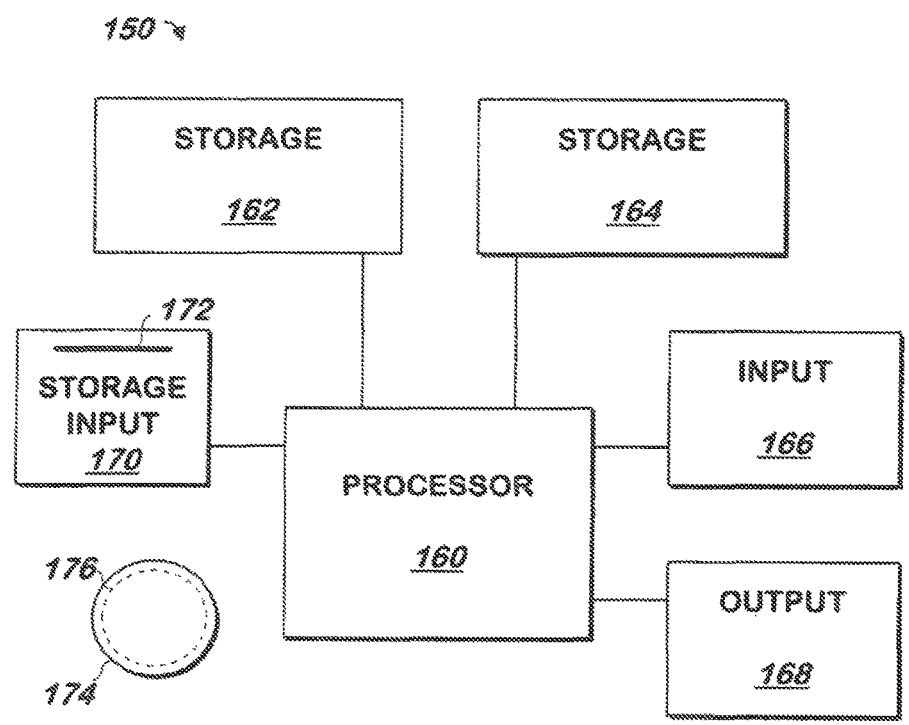
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the MOZILLA browser commercially available from MOZILLA FOUNDATION of Mountain View, Calif. or INTERNET EXPLORER browser commercially available from MICROSOFT above, although other systems may be used.

Figure 2A:
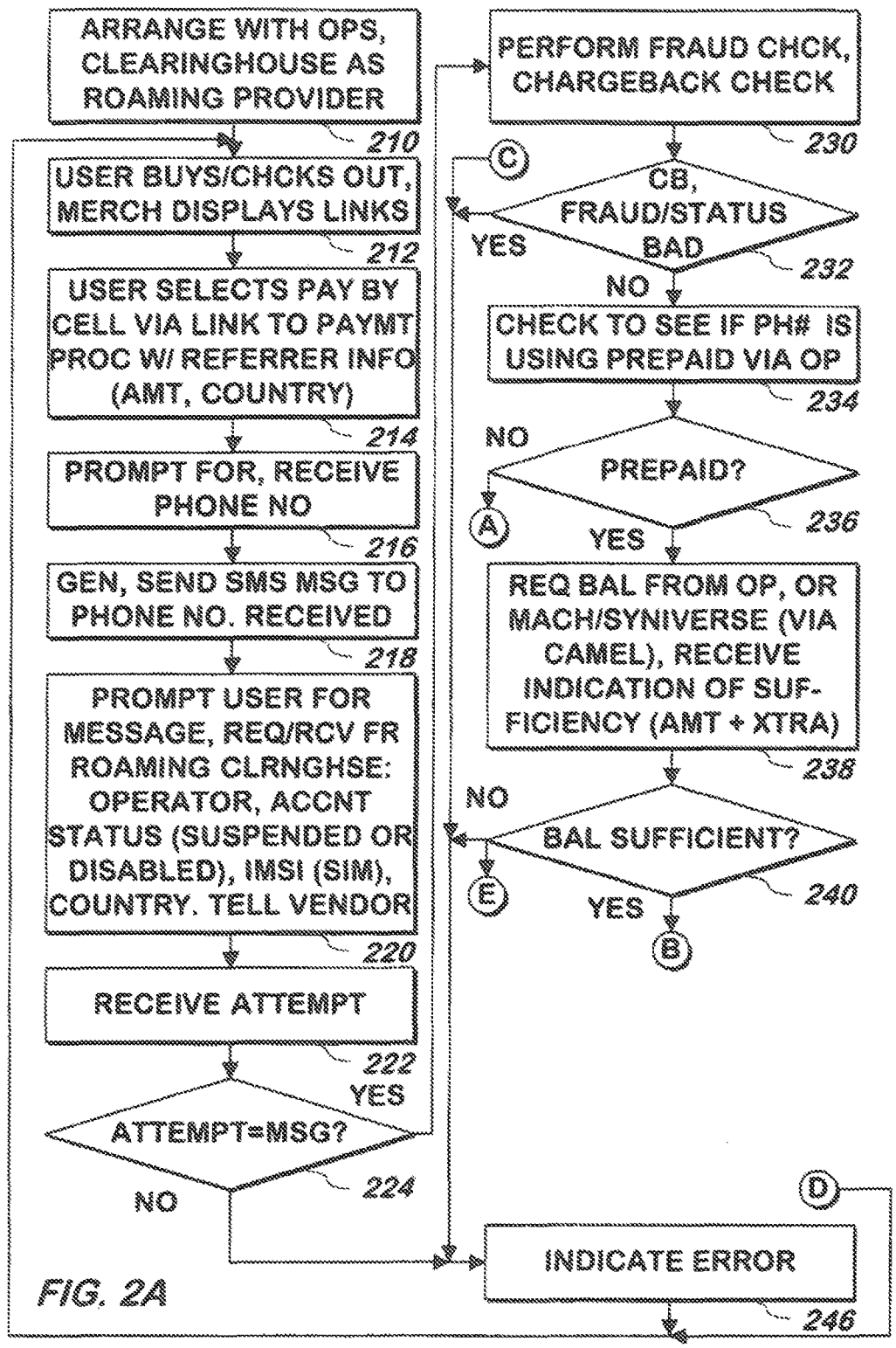
FIG. 2, consisting of FIGS. 2A, 2B, and optionally, 2C, is a flowchart illustrating a method of charging a user's cellular telephone account for a purchase made from a merchant, such as an online merchant according to one embodiment of the present invention.

FIG. 2, consisting of FIGS. 2A, 2B and 2C are a flowchart illustrating a method of processing payments by charging a cellular telephone account over a network according to one embodiment of the present invention. The party performing at least some of the method illustrated in FIG. 2 is referred to herein as a cell phone payment processor, and this party arranges with cellular telephone operators and/or conventional cellular telephone payment clearinghouses such as Syniverse or MACH to act as a provider of cellular telephone roaming services, including international cellular telephone roaming services) in the same manner as a true provider of conventional cellular roaming services would. Roaming refers to providing service on a cellular telephone network to a subscriber of a different cellular telephone service. The party providing the roaming service does not have a contractual relationship with the user for the use of the phone being used on their network, but may have a relationship with the user's cell phone operator for providing roaming services. Other conventional roaming definitions may also be used.

In one embodiment, the cell phone payment processor, who is the party arranging to act as a provider of roaming services, will not be providing as much roaming service as payment processing services as described herein. A party who provides more, or far more payment processing services than actual cellular roaming services may be referred to as a "sineroaming" roaming services provider. Such a party may provide no actual conventional cellular roaming services at all. In one embodiment, a sineroaming roaming services provider does not have a customer relationship with some (in one embodiment), most (in another embodiment), or all of the subscribers of other cellular telephone services who use it for payment processing as described herein.

User Purchases and Check Oat.

To use the system and method of the present invention, a subscriber of cellular services (the subscriber is referred to interchangably as the "user" and the "subscriber") uses an online merchant to purchase goods or services in a conventional fashion, and then checks out 212. In one embodiment, each product is a product other than a mobile device-related product and each service is a service other than roaming or another mobile-related service. In one embodiment, the purchase and check out may be made via a conventional browser using the Internet. The browser may be running on the same cellular telephone that the user uses for placing calls, but the browser may instead be running on a conventional computer system, such as a conventional personal computer system, one which has no connection to the user's cellular telephone that is evident to the merchant.

In one embodiment, when the user checks out, the user is asked for the form of payment as part of step 212. Forms of payment may include credit cards as well as payment by cellular telephone. If the user selects payment by cellular telephone 214, the user is requested to enter their cellular phone number and such information is received 216. (If the user selects a different form of payment, the selected other form of payment is processed in a conventional fashion).

Any or all of the request for type of payment and the request and receipt of the telephone number may be performed by the merchant, the party who will perform some or all of the remainder of the steps of FIG. 2 (i.e. the cell phone payment processor) or any other party.

The user may be referred (e.g. via a redirect or a link) to the party (the cell phone payment processor) who will perform some or all of the remainder of the steps of FIGS. 2A and 2B following any such actions performed by the merchant or other party. In one embodiment, the merchant refers the party with an identifier of the merchant, the amount of the transaction corresponding to the goods and services purchased, and optionally other information described below in the URL used to refer the user. If the merchant or a third party receives the telephone number, the telephone number may also be part of the referrer information. In one embodiment, referrer information is information to the right of a slash ('/') that follows the domain name in the URL used to refer the user. In another embodiment, the user is not referred, but all such information is provided (e.g. via a network such as the Internet) to the cell phone payment processor performing some or all of the remainder of the steps of FIGS. 2A and 2B. The referral or otherwise providing such information (i.e. to the cell phone payment processor) operates as a request by the merchant for payment for the goods or services ordered. As described below, if some or all of the conditions described below are met, the request will be fulfilled via a charge to the cell phone account corresponding to the telephone message.

Check to See the User has the Phone.

As a result of receiving the referral, an SMS text message is generated and sent to the user's telephone 218 using the number the user provided, and the user is requested 226 to enter some or all of the text message received using the web session that may have been referred, in order to check to see that the user of the web session has the telephone (which is at least an indication that the user of the web session is the subscriber corresponding to the phone).

The subscriber then provides such message or part via the web session, and the entered message is compared with the pertinent portion of the message sent to the subscriber's telephone to see if a correspondence, such as a match, has occurred between those two pieces of data 222. If a correspondence occurs 224, the method continues at step 230.

If a correspondence does not occur 224, an error is indicated 246, and the method continues at step 212, where a different request is received. Indication of the error in step 246 may include telling the merchant why the error was detected, for example, because the message was not returned, or the account status was suspended or disabled as described below. Step 246 may include referring the user to a special merchant page.

Request Information about the Subscriber Account.

In one embodiment, while waiting for the user to provide the message as described above, information about the account corresponding to the phone number entered is requested and received as part of step 220, for example, from a roaming clearinghouse, such as MACH or Syniverse. In one embodiment, the information may be requested from individual cellular telephone service providers, such as by querying the service providers corresponding to the country code of the cellular telephone number received, in order or approximate order of market share until the service provider indicates the phone number corresponds to an account of one of its customers, or by requesting an identifier of the user's cellular telephone service provider (also referred to as an "operator") from a clearinghouse, and then querying that operator.

To query in order or approximate order of market share, the cellular telephone service providers corresponding to each of several or all country codes are identified, and market share or estimates of the market share for each cellular telephone service provider is received for each of the country codes for which cellular telephone service providers were identified. When information about an account corresponding to a telephone number is desired, the country code is extracted from the telephone number, the cellular telephone service providers that service that country code are identified using those identified as described above, such cellular telephone service providers are ranked in decreasing order of market share, and information about the account corresponding to the telephone number is requested from each such provider in the ranked order until a response containing the desired information as described below is received. The requests may be made one at a time or several may be in progress at any given time, for example, by querying the top three simultaneously, and if none of them responds with an account status, querying the remainder of the providers in decreasing order one at a time until an account status is received.

In one embodiment, the information is requested from the clearinghouse using the telephone number received, and the information requested and received may include an identifier of the cellular telephone operator, the status of the user's account (i.e. suspended or disabled) and phone (on or off), and the IMSI (International Mobile Subscriber ID) of the SIM card or other identifier of the telephone that allows the phone to identify itself on the operator's network.

In one embodiment, the portion of step 220 that requests and retrieves information from the clearinghouse may be performed at a different time, such as after the user has successfully returned the message as described above. In such embodiment, such portion of step 220 may be performed only if the user has successfully returned the message and the method continues at step 230. If the user does not successfully return the message, the method continues at step 246.

Fraud/Chargeback Check.

A fraud and chargeback check is optionally performed 230. In one embodiment, the fraud check identifies the country in which the user is using the Internet based on the IP address of the user and a database matching IP addresses to the countries of origin, identifies the home country of the user based on the telephone number of that user and a database of country codes, identifies the country of the merchant (via a database) or the country in which the goods are being shipped (e.g. by asking the user for this information or receiving it from the merchant in the referrer information), and identifies whether the country in which the user is operating or roaming. In one embodiment, the country handling the user's most recent cell phone communication (which may be a call or the phone communicating with a cell tower to identify its location) is provided by the clearinghouse as part of step 220 above. Fraud is determined using these countries. For example, if the country corresponding to the user's phone number is different from the country of the merchant or the country to which the goods are being shipped, and that country is different from the country corresponding to the user's IP address, fraud is indicated unless the user is roaming in that country, in which case, fraud is not indicated. A score may be assigned based on such factors, with scores adjusted based on the actual countries involved. For example, if one or more of the countries is associated with extreme poverty, a score more indicative of fraud may be assigned than if no such countries are involved. Fraud is detected if the score exceeds a threshold.

In one embodiment, the operator cell phone payment processor may query the operator handling the call for the cell tower being used, and the user's location may be more specifically identified based on the location of the cell tower.

The chargeback check checks for unacceptably high numbers of returns by a user corresponding to an IMSI. Each merchant may specify a threshold number of chargebacks or chargebacks per unit of time or absolute value of dollar amount of chargebacks or absolute value of dollar amount of chargebacks per unit of time that are allowed by a user before this test fails for that user. A chargeback is a charge that results in the merchant funds being paid to the user, for example, due to a dispute that the user files with the transaction network. In one embodiment, only chargebacks for that merchant for the same customer are counted towards the threshold and in another embodiment, all chargebacks for the same IMSI are counted towards the threshold. In one embodiment, only chargebacks to a merchant who sells merchandise (as opposed to a user who is really just transferring money to a different subscriber) are counted towards the threshold. All chargebacks are recorded by the system and method, and stored, associated with the IMSI, for at least the maximum unit of time, such as a year.

If fraud is detected, or the account status was received as negative (e.g. suspended or disabled) 232, or the chargebacks for the user exceed the merchant's threshold, the method continues at step 246. Otherwise 232, the method continues at step 234.

Determine if Prepaid or Post Paid Account.

A check is made 234 to the operator's prepaid platform to determine if the subscriber is a prepaid subscriber (e.g. the subscriber ordinarily pays in advance and service will be terminated if the balance falls below zero or an amount near zero), or a postpaid subscriber (the subscriber is issued credit for service, to be paid for after the service is provided). In one embodiment, there may be different platforms for prepaid and postpaid subscribers. In other embodiments, a single platform is used, with an indicator indicating whether the subscriber is prepaid or postpaid, and the indicator is used to determine whether the subscriber is prepaid or postpaid. A database of operators and platform locations maintained by the cell phone payment processor may be used to locate the platform. Each operator may have its own platform or platforms that it uses, the details of how to use such platform or platforms being received from the operator and stored in the database.

If two platforms are used, the prepaid platform allows identification of whether a subscriber having a given phone number has a prepaid plan or a postpaid plan. The prepaid platform may identify the balance on the account, and the postpaid platform may identify the account status (e.g. in good standing, not in good standing, or closed). In one embodiment, all such information is available on a single platform. The platform may be the same platform used to maintain account information or it may be a separate platform from such platform, with information that is slightly out of date.

In another embodiment, a roaming clearinghouse may provide information that can be used to determine whether the subscriber is prepaid or postpaid and such clearinghouse is used to make the determination. The database may indicate which operators for which the clearinghouse should be used and which operators provide access to their platforms and so the clearinghouse need not be used.

The telephone number or IMSI is used to identify the subscriber to determine whether the subscriber is prepaid or postpaid on the platform or clearinghouse. In one embodiment, information is only supplied indicating that the subscriber is a prepaid subscriber, and thus, if the subscriber's account is not indicated as being prepaid, the subscriber is assumed to be postpaid, otherwise, the subscriber is prepaid.

In one embodiment, the database indicates whether this assumption should be made for a given operator and it is made if so indicated in the database.

In one embodiment, if the account is not located on the prepaid platform, postpaid type is assumed and in another embodiment, if the account is not located on the prepaid platform, a postpaid platform is used to verify that the account is of a postpaid type. If the account is located on the prepaid platform or is indicated, on a shared prepaid/postpaid platform as being prepaid, the account type of prepaid is used for the user.

If the subscriber is a prepaid subscriber 236, the method continues at step 238, and otherwise 236, the method continues at step 260 of FIG. 2B.

Prepaid Accounts

At step 238, the balance of the prepaid user is requested and received, either from the operator, or from a clearinghouse such as MACH or Syniverse, for example, using the conventional CAMEL protocol, or using other conventional middleware. The manner and details of making the request may be stored in the database associated with each operator, and the operator identified as described above is used to identify the manner and details of making this request. The details of how to make requests of operators platforms are worked out with the operator, each operator may use a different technique.

In one embodiment, some or all operators require that a subscriber maintain a minimum balance, and so a charge that will cause the subscriber's prepaid account to drop below the minimum balance will be refused by that subscriber's cell phone service provider. In one embodiment, the amount that is available to be charged is returned as part of the response to the balance request. In another embodiment, the minimum balance is returned with the balance request, or it may be otherwise requested and received. In still another embodiment, the database may include the minimum balance for each of some or all carriers, identified by trial and error (attempting to request the entire balance of an account, receiving a refusal, and then repeatedly backing off by one cent and trying again and again, receiving refusals until the charge is allowed, and then identifying the difference between the charge allowed and the balance of the account as the minimum balance), by asking each carrier, or, for each carrier, by recording the difference between the amount requested and the balance in the account for that carrier, and identifying the minimum as the smallest difference between the amount requested and the balance that is allowed by the carrier, when a difference a threshold amount less than that amount (e.g. one cent, or the smallest unit of measure regularly used by the currency corresponding to the carrier) has not been allowed by the carrier.

If the balance is insufficient to support the charge received from the merchant 240, the method continues at step 246 and otherwise 240, the method continues at step 264 of FIG. 2B.

In one embodiment, step 238 includes requesting a hold on the subscriber's account in the amount of the charge (referred to as a "reserve") so that future requests for the subscriber's balance, for example by other roaming service providers, will produce the balance, less the amount of the reserve, so that the balance is not overdrawn by multiple charges occurring prior to settlement. In such embodiment, the reserve may be released as part of step 246 if funds are insufficient, or it may be captured (i.e. committed) as part of step 264 to indicate that settlement will occur. In one embodiment, the reserve may be captured in part, with the remainder released if not fully used.

Virtual Layaway.

In one embodiment, step 280 of FIG. 2C follows the "no" branch of step 240 of FIG. 2A. That is, if the user's prepaid balance is insufficient 240, the method continues at step 280 of FIG. 2C.

At step 280, the subscriber is informed (e.g. via the web or a text message to the subscriber's phone) that his prepaid balance is insufficient and instructed to increase the prepaid balance by at least the amount that would allow the transaction to proceed. In one embodiment (not shown in the Figure), the subscriber may decline the offer, the merchant is notified that the transaction should be aborted, and the method continues at step 212 of FIG. 2A.

In one embodiment, the user may set up a payment schedule instead of a single payment, to allow the user to pay off the amount of the charge in installments. In such embodiment, the amount and schedule of such payments to be deducted from the user's account is requested and received 282.

In one embodiment, the merchant is informed 284 to hold the order, and the merchant may either supply an order identifier or one is generated and supplied to the merchant to allow the order to be referred to at a future time as described herein. In one embodiment, when the merchant receives the hold, the merchant may reserve inventory for the order, so that it does not get sold out before the user can pay for it.

The method waits an amount of time, such as a day or the amount of time to the first payment in the payment schedule received as described above, and the balance is requested and received from the user's cell phone account as described herein 286. If the balance is sufficient to make the next scheduled payment (which may be the only payment) 288, the method continues at step 290 in one embodiment, or step 294 in another embodiment as indicated by the dashed line in the Figure, in which case only a single payment is used. No input from the user is required to cause these steps to be performed, in one embodiment.

At step 290, the order is credited by the amount of the scheduled payment or the entire amount and, if a scheduled payment was used, a determination is made as to whether the total of credits for the order matches the amount of the order. The method additionally continues at step 264 of FIG. 2B to begin the settlement process for the current payment amount or entire amount and also continues at step 292. If the total of credits for that order matches the amount of the order 292, the method continues at step 294 and otherwise 292, continues at step 286.

At step 294 successful payment is indicated to the merchant and the merchant account is credited for the total amount, less a fee due the party performing some or all of the steps of FIGS. 2A-2C and the merchant provides the goods or services as described herein.

If, after the amount of time the system waits, the balance is insufficient, the method continues at step 246. In such embodiment, step 246 may include crediting the user with the amount paid towards the transaction.

In one embodiment, if the balance is insufficient, but there has been an amount already paid towards the transaction, and the number of times an insufficient balance has been encountered since the last payment is less than a threshold, the method continues at step 286. In this manner, after the first payment is made, the user may be given more than one attempt to provide payment. In one embodiment, as the end of the period of time the method waits is approaching the end, the subscriber is sent a text or e-mail message reminding them that the next payment will be deducted. Their prepaid balance may be requested and provided with such message in one embodiment.

Post Paid Accounts.

At step 260, an indication of the customer's creditworthiness is requested from the operator or a roaming clearinghouse, such as MACH or Syniverse. In one embodiment, to request the creditworthiness of the customer, the database is consulted for the details of making such a request for the operator received as described above, and those details are followed by applying the telephone number of the subscriber to the details listed for the operator. Each operator may have a different technique for obtaining this information. The response to the request is interpreted in accordance with details for interpreting the response for that operator in the database to determine if the subscriber is creditworthy or not. The details and interpretation may be a function of the amount of the purchase, for example, with lower amounts being processed according to one set of details and higher amounts being processed according to a different set of details, all such details and the threshold amounts causing one set of details to be used instead of another being stored in the database for each operator.

In one embodiment, a per transaction credit limit may be imposed for each operator and stored in the database, and/or a credit limit may be used for all operators, and customers are not considered creditworthy if the transaction exceeds the applicable credit limit for that operator or for all operators, whichever is lower.

If the subscriber is determined not to be creditworthy 262, the method continues at step 246 of FIG. 2A, and otherwise 262, the method continues at step 264.

Payment Processing.

At step 264, an entry is generated and either sent to a roaming clearinghouse, such as MACH or Syniverse or held until a number of entries is received or an amount of time elapses, at which point the number of entries or the entries held until the amount of time elapses are sent to the clearinghouse. An entry may be sent to the operator to which it pertains in another embodiment, or a combination of sending some entries to a clearinghouse and other entries to operators may be used. In one embodiment, each entry includes the name or other identifier of the operator received as described above, the IMSI retrieved as described above, the amount of the transaction in the currency of the merchant, the amount in currency local to the operator, and a description received with the referrer information from the merchant as described above. The description may include the name of the merchant and a description of some or all of the goods and/or services ordered in the transaction.

In one embodiment, the other identifier may include a TADIG number (Transferred Account Data Interchange Group number) of the operator, and/or the PMN (Public Mobile Network) code of the operator maintained in the database of other operator information described herein.

In one embodiment, there are two amounts: one is the amount of the charge to the subscriber and the other is the amount the subscriber's operator should remit as payment to the clearinghouse or other intermediary, the difference to be kept by that operator. This allows the operator to take a fee for collecting and providing the funds. The user will see the amount of the charge, but may not see, or even be aware of, the amount the operator is remitting. In one embodiment, the amount charged to the user is the amount charged by the merchant, with the merchant collecting less than this amount, and in another embodiment the amount charged to the user is an amount higher than the amount charged by the merchant.

The clearinghouse or cell phone service provider converts 266 the entry into a conventional TAP record used for roaming charges, including the description added to where the name of the roaming operator would ordinarily have gone. The subscriber's operator may include the description on the invoice or statement of charges the subscriber receives from that operator in paper form, or the invoice or statement of charges that is made available in web form, to allow the subscriber to identify the charge. Step 266 includes providing the TAP record or the information that will be part of the TAP record to the clearinghouse. In one embodiment, step 266 includes generating a conventional CDR file of the charges and the user's operator that will be used for settlement Each of the clearinghouses clears transactions for certain of the operators, and if the clearinghouse to which the entry was sent does not clear transactions for the operator for that entry, it provides 268 the corresponding TAP record to the other clearinghouse. The clearinghouse that clears such transactions provides 270 the TAP record to the operator. The operator will charge the subscriber's telephone account in the manner of a roaming service charge. Thus, even though no roaming service was provided, the subscriber will see a roaming service charge on his or her mobile telephone account resulting from the purchase of goods or services from a merchant, even though the goods may be any goods, and may not be cell phone related goods, and services may not be conventional sell phone services, where voice text or data is carried over a cell phone network in return for the charge.

A successful payment is indicated to the merchant and an amount equal to the charge less a fee due the cell phone payment processor is credited to the merchant's account and the charge or remittance amount is debited from a bookkeeping account corresponding to the operator as described above, either in the local currency of the merchant (or the party performing at least some of the method of FIG. 2) or the subscriber or the operator, or in conventional SDRs, a basket of currencies 272. Step 272 may be performed at an earlier time, for example, after steps 262 or 240. As part of step 272, as a result of receiving the indication of successful payment described above, the merchant then provides the ordered goods, either by physically shipping them or providing them electronically over a network such as the Internet. Services that were ordered may be provided by the merchant as part of step 272 by performing a physical action or by sending information over a network, such as the cell phone network, for example, to the subscriber's mobile device. Providing goods or services in this fashion is referred to herein as "Performing a Goods or Services Action" or that the merchant "Performs a Goods or Service Action". Performing a Goods or Services Action may include, without limitation, SMS or other mobile ticketing, in which a ticket to an event or another type of ticket is provided via an SMS text message or other message sent to a mobile device, such as a USSD message.

The method continues at step 212 (or the method may continue at step 212 from step 264, with steps 266-270 operating as a separate, independently operating process). Any number of transactions may be processed in this fashion, and some transactions may be simultaneously processed with other transactions.

Although a single user and merchant is described above, the system and method allows multiple users purchasing from different merchants to process payments via a cellular telephone account in the same or similar fashion. Communication between the user, merchant, cell phone payment processor and clearinghouses may be performed using the Internet. In one embodiment, any communication described herein may be performed using conventional SS7 techniques and using the conventional SS& protocol.

GSM vs. CDMA.

The procedures described above refer to GSM phones. CDMA telephones may use a similar process, with CIBER replacing CAMEL or a TAP record. In one embodiment, the database matches carriers to CDMA or GSM, and the appropriate protocols are used for each when the carrier is identified as described above. In another embodiment, the clearinghouse provides the network type as pan of step 220. In still another embodiment, the conventional APIs corresponding to each protocol are used until one provides an appropriate response. The API that works may be associated with the phone number in a subscriber database, and that API is used first to attempt to reduce the number of API calls made, while allowing for the possibility that the proper API for that phone number may change.

Settlement.

Settlement between the operator of some or all of the steps of the method of FIG. 2 (consisting of FIGS. 2A and 2B) and the cellular telephone operators who pay on behalf of the subscriber is made as shown according to FIG. 3.

Referring now to FIG. 3, the operator of some or all of the method of FIG. 2 registers 310 to the clearinghouses, MACH or Syniverse, as a roaming service provider if such operator has not done so as described above. Any charges in entries received (as records) as described above are converted 312 by the clearinghouse or by the operator of some or all of the method of FIG. 2 to SDRs from the local currency of the operator. SDRs are a conventional basket of currencies.

The operator's clearinghouse will aggregate 314 105% of the SDRs for each operator and at the end of a period, such as a certain day of the month, will offset credits and debits in each operator's account and settle all creditors and debtors according to what is owed, using the extra 5% for change in currency conversion differences 316. The clearinghouse then credits or debits the operators' accounts in their local currency 318.

Registration.

In one embodiment, the user may associate their cell phone with a user account at a merchant trusted by the cell phone payment processor who performs some or all of the method of FIG. 2. After a first time, in which the process above may be followed, even for a pretend charge made at the time of registration, the user can then make subsequent charges from that same account at the merchant using their cell phone accounts without having to repeat the entire process described above. In this embodiment, after the user completes authentication process at a first time via a first charge or test as described above, at a second time, after the first time, that the user makes a charge from the same merchant, the method does not make another attempt to validate the user via the challenge and response, at least for a period of time after the first challenge and response has been properly performed. The benefits of the convenience of such an approach may be worth the lower level of security that occurs from not validating that the user has the phone when the merchant registers the user and therefore, authenticates the user via the merchant's own procedures (e.g. via a username and password) and the typical charges at such a merchant are small. One embodiment of this approach is described in FIG. 4.

There are different ways of handling the registration and purchases of products and services. In one embodiment, when the merchant registers the user, the merchant allows the user to specify their cell phone number, and the merchant initiates a $0 charge as described above in order to allow the user to be set up with the cell phone payment processor. In another embodiment, the merchant will not make any charge via the cell phone payment processor until the user purchases a product or service. In whichever arrangement is used, the first time the merchant makes the $0 or the real charge, the user will receive, via a text or other message sent to the user's mobile device, the challenge phrase from the cell phone payment processor. Subsequent to that, at least for a period of time or number of charges or other threshold amount, charges from the same registered user identifier will not require sending of a challenge phrase or the challenge phrase to be responded to by the user.

FIG. 4 is a method of processing payments using a cellular telephone account for a registered user of a web site according to one embodiment of the present invention.

The cell phone payment processor registers as described above in step 210 as described above if it has not already done so as described above.

The user signs in (or registers), and optionally adds products and services to an online shopping cart, and checks out as described above or merely completes a registration process. The merchant provides the cellular payment processor with the amount (which may be zero if no products or services were added, but the user is instead just checking out), an identifier of the merchant (or such identifier may be inferred based on the referring URL or using other conventional techniques) along with an identifier of the user that the merchant will use to identify the user to the cellular payment processor and other information as described above 410. The identifier of the user may be the user identifier used to identify the user to that merchant or it may be a unique alias that the merchant can assign to the user or calculate by hashing the user identifier the user uses to identify himself or herself to the merchant to produce a unique result, such as by a substitution cypher or using other conventional techniques.

The user is authenticated, and payment is processed 412 as described above with respect to FIG. 2. If the charge is 0, however, no charge is actually made to the user's cell phone, nor is a credit provided to the merchant, though a $0 credit may be provided to the merchant to indicate that the authentication process is complete. In addition, the cellular payment processor also associates 414 the merchant identifier and identifier of the user with the cellular telephone number and IMSI received as described above. This information will allow detection of whether the user has closed his or her cell phone account or changed telephone numbers, which would impact the ability to charge the same cell phone account to receive payment from that subscriber by charging the same telephone number as described above.

At a later time, the user may log into the same user account at the same merchant, adds additional goods and services to an online shopping cart that may be different or the same as the goods and services previously paid for by that user, as described above 416. The merchant will again send to the cell phone payment processor the merchant identifier (or information received by the cell phone payment processor will allow the cell phone payment processor to identify the merchant), the amount of the charge, and the user identifier or alternate user identifier for the user. The user identifier or alternate user identifier may be the same one sent previously for that user, or may be an identifier that otherwise allows the cell phone payment processor to identify the user as the same user.

The above technique may be used, for example, for a one click shopping experience, in which the user does not separately check out, but merely clicks a button to instantly purchase the item. This technique may also be used for recurring charges, such as subscriptions.

If the charge meets one or more criteria, such as the charge is under a threshold limit and the merchant is trusted, and an amount of time since the prior charge from that same user for the same merchant does not exceed a threshold amount of time 418, the method continues at step 420, and otherwise 418, the method continues at step 412.

At step 420, the telephone number is used to identify the user's IMSI from a roaming clearinghouse as described above with reference to FIG. 2A, and that IMSI received is compared to the one previously stored for the combination of merchant identifier and user identifier received as described above.

If the IMSI requested and received from the clearinghouse does not match the one stored 424, the method continues at step 412. In this case, the steps that initiate the charge to the user's cell phone, the credit to the merchant, and the performance of the goods or services action, will thus not be performed in response to the most recent receipt of the information from the merchant as described above.

In one embodiment, if the IMSI requested and received from the clearinghouse does not match the one stored, the transaction is refused instead of continuing at step 412. In this embodiment, the merchant may elect to reregister the user, for example via a $0 charge, as described above, or may provide the actual charge with an additional referrer field that indicates that the user is being reregistered. In one embodiment, instead of providing such information via referrer information, a separate API is used to allow the merchant to pass the information that would be in the referrer information to the cell phone payment processor without referring the user to a web site operated by the cell phone payment processor.

If the IMSI requested and received from the clearinghouse does match the one stored 424, the transaction continues at step 264. Thus, payment is processed, (the user's cell phone account is charged and the merchant receives a credit), the merchant is informed of a successful payment, and the goods or services action is performed by the merchant, without the challenge and response or other checking to see that the user has the phone in one embodiment, and in one embodiment, may even proceed without regard to creditworthiness or the balance in the account, though in another embodiment, instead of continuing at step 264, the method continues at step 231 if the prior payment was from a prepaid account. The account type may be stored as part of step 414 in this embodiment and the determination as to whether the account is a prepaid account may use such stored account type.

Other Ways of Charging a User's Cell Phone Account.

In one embodiment, if the charge cannot be made to the user's cell phone account via roaming charges, in one embodiment, one or more premium SMS charges may be assessed to the user's cell phone account, with the total of the charge for the one or more premium SMS messages being equal to or approximately equal to the total amount of the charge that would have been made to the user's account as described above. This allows users for whom roaming charges cannot be assessed to use the system and method described above.

Merchant does not Support Cell Phone Payment.

The merchant may not support payment by cellular telephone. In such case, alternative arrangements to cellular telephone payment processing may be employed.

There are several embodiments of the present invention that address this issue. The embodiments share a common theme, in that the user uses his cell phone to fund or pay for a debit or credit card, the card number is supplied to the user (along with an expiration date and security code, e.g. CCID), and the user supplies this information to the merchant to pay for the goods or services ordered from the merchant, such as an online merchant in a conventional manner. The amount transferred to the card may be the amount charged to the card by a merchant, and an additional fee may be charged for the transfer. The amount transferred to the card may be an amount that can be independent of any merchant charge, such as an amount specified by the user. Because the card is a conventional credit card or debit card, no direct relationship between the cell phone payment processor and the merchant needs to be arranged, though the conventional indirect relationships through a transaction network such as Visa or Mastercard are utilized In this case, the cell phone payment processor becomes the merchant and sells credit services or prepaid or on demand debit cards or funds existing debit cards. The user then takes the card information for the card to a second merchant and uses the card to purchase goods and/or services from the second merchant.

Figure 5A:
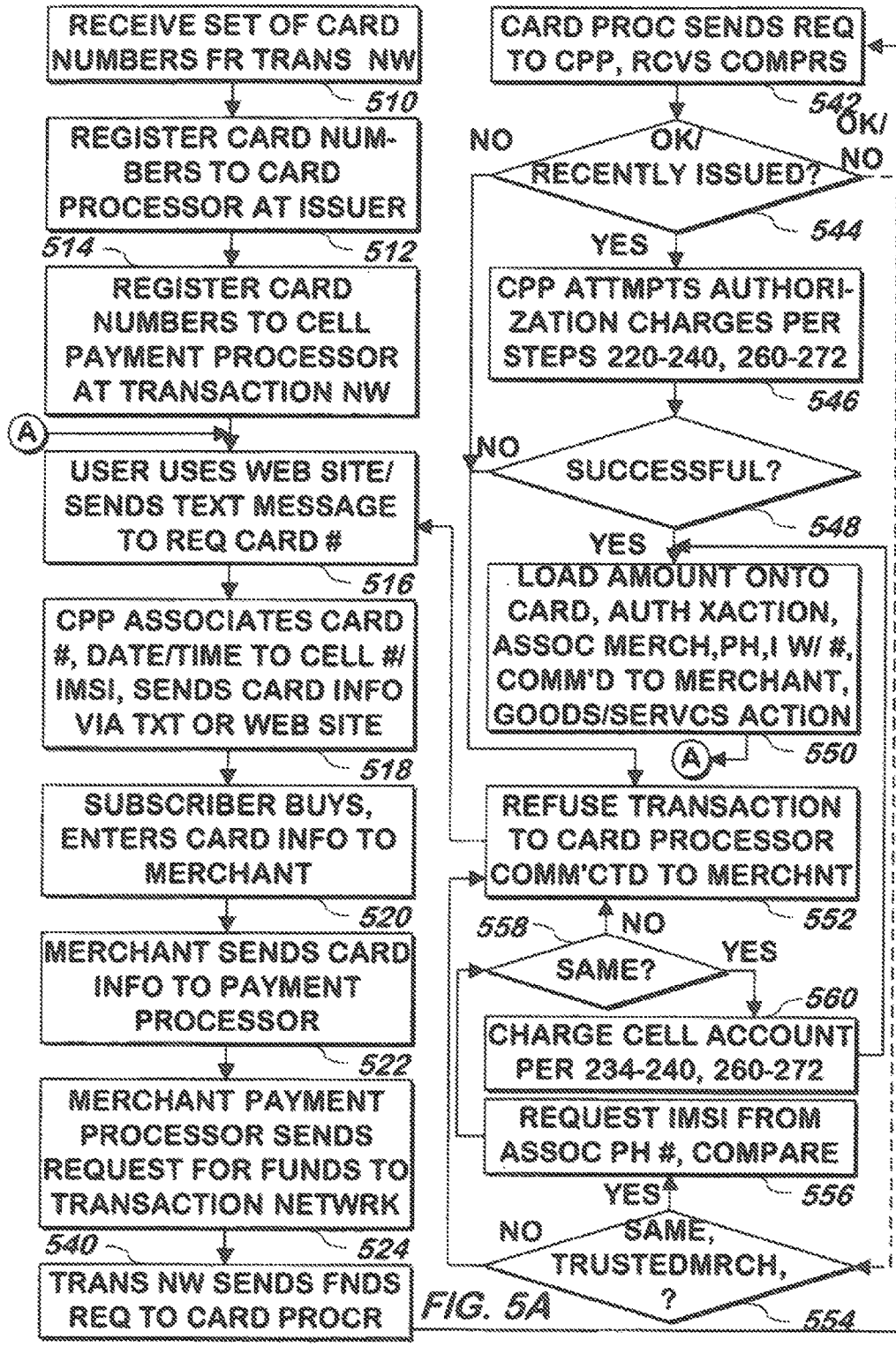
FIG. 5A is a method of paying for goods or services using a payment card that charges a user's cell phone account upon demands made to the card according to one embodiment of the present invention.
Figure 5B:
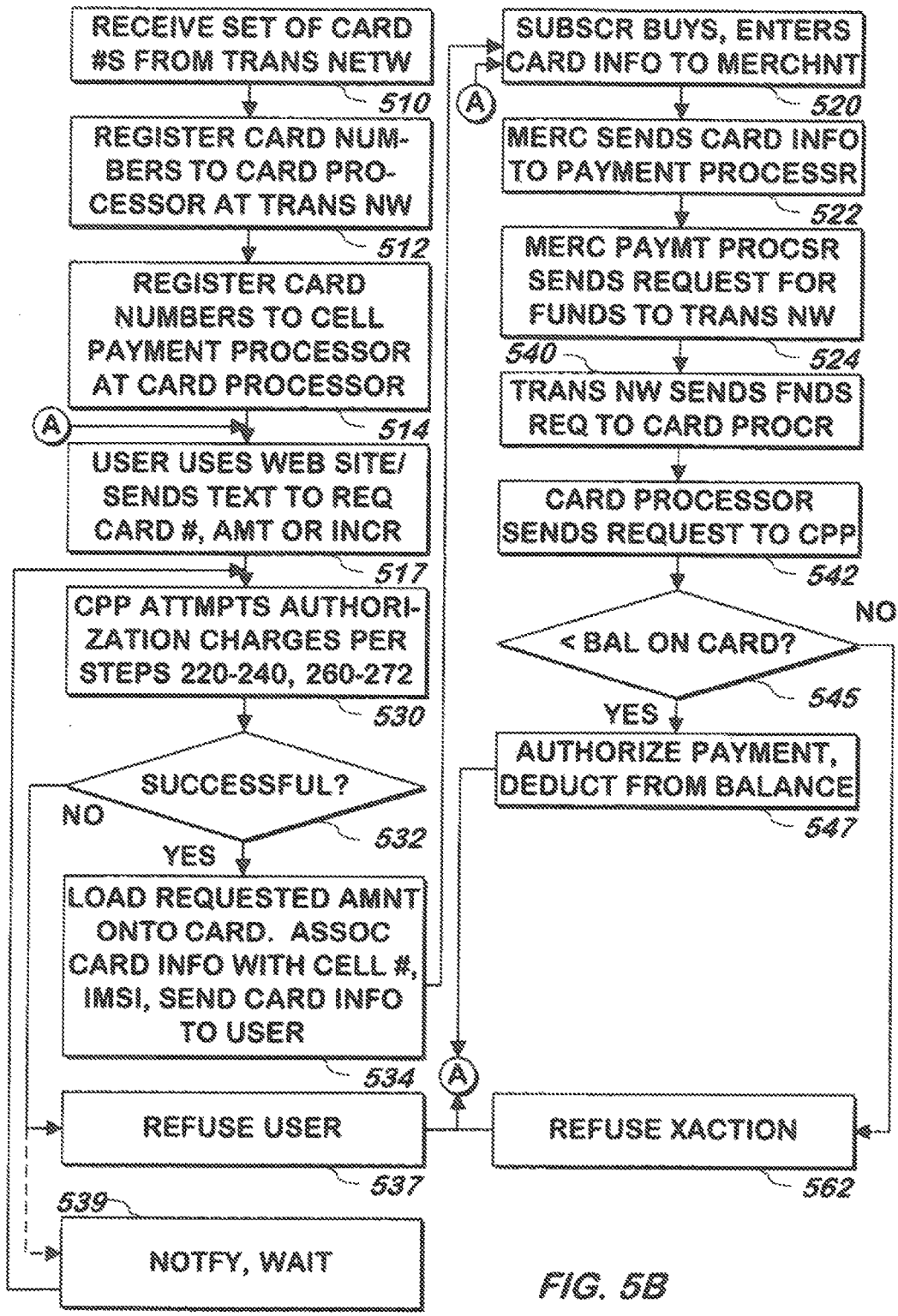
FIG. 5B is a method of paying for goods or services using a prepaid debit card funded through a user's cell phone account according to one embodiment of the present invention.

In each of FIGS. 5A and 5B, the cell phone payment processor registers as described above in step 210.

Funding in an Amount of Each Char.

Referring now to FIG. 5A, a method of providing and using a debit or credit card account funded by a cellular telephone account upon charges made by a merchant is shown according to one embodiment of the present invention. In this embodiment, any amount charged to the card initiates a transfer from the user's cell phone account to the card as described above to fund the charge. The method operates with either a prepaid or postpaid cell phone account.

Card numbers are obtained from an transaction network and registered through the transaction network and a card processor to the cell phone payment processor. In one embodiment, to register the card numbers, a set of card numbers are requested and received 510 from a transaction network, such as Visa or Mastercard, optionally via an issuing bank if the payment processor is not operating in this capacity. The card numbers received are registered 512 to a credit and/or debit card processor, referred to as a "card processor", by the transaction network. The card numbers are registered 514 to the cell phone payment processor by the card processor. In one embodiment, the recipients of the card numbers of step 510 are both the card processor and the cell phone payment processor, though the cell phone payment processor may receive the numbers from the card processor after it receives the numbers from the transaction network.

The subscriber requests 516 a card number via an SMS short code or a USSD code or a message from a mobile application installed or running on the subscriber's mobile device sent to the cell phone payment processor (and the message received by the cell phone payment processor will include the sender's phone number) or via a web site of the cell phone payment processor or other related party. In the case of the web site, the subscriber may also identify his or her phone number, and a challenge phrase may be sent to the user's phone (e.g. via SMS or USSD message) for the user to enter to the web site in order to validate the request (unless the user logs on using a username and password, in one embodiment, because the user authenticates himself or herself via the log on). In this case, the amount of the purchase may not be specified as part of the request. Messages may be sent via SMS or USSD.

The cell phone payment processor receives the cell number and (optionally, if it validates it as described above) associates 518 one of the card numbers it receives as described above, and optionally the date and time, with cell phone number and the IMSI corresponding to the received phone number, which it requests from the clearinghouse using the cell phone number as described above as part of step 518. Card information, such as card number, expiration date and a security code, each received as part of step 510 (or generated and stored, associated with the cell phone number, and optionally provided to the card processor and/or transaction network as part of step 518) are provided to the subscriber as part of step 518. The card may be a credit card or a debit card.

The subscriber purchases goods and/or services online or in a store and provides 520 some or all of the card information to the merchant, who sends 522 to the merchant's payment processor, for example, over a network, some or all of the information received, and an amount to be charged. The merchant's payment processor forwards the request to the transaction network 524 and the transaction network forwards 540 some or all of the information in the request to the cell phone payment processor's card processor. In another embodiment, at steps 524-540, the merchant's payment processor sends the card number to the transaction network, who identifies the cell phone payment processor's card processor to the merchant's payment processor, and the merchant's payment processor sends some or all of the request directly to the cell phone payment processor's card processor.

The card processor sends some or all of the request to the cell phone payment processor 542.

The cell phone payment processor receives the request and uses the account number to compare the other information, such as expiration date received with the request against that stored at step 542. If the other information does not match or the card number cannot be found or is not associated with a cell number 544, the transaction is refused at step 552, described in more detail below.

In one embodiment, the user only has a limited amount of time from issuance to use the card. In such embodiment, if the card was issued less than a threshold amount of time ago 544, the cell phone payment processor attempts 546 to authorize (and make) the charges to the subscriber's cell phone as described above with reference to some or all of steps 220-240 and 260-270, with the following differences. Instead of step 246, step 552 is used: that is, if the attempt is unsuccessful 548, for example, because the subscriber's prepaid balance is insufficient, the cell phone payment processor refuses the transaction to the cell phone payment processor card processor 542. The card processor will communicate the refusal to the merchant payment processor, optionally via the transaction network, and the merchant payment processor will inform the merchant, who will refuse to perform the goods or services action.

In one embodiment, the challenge and response check is not performed as part of step 546, because it is performed at the time the user requests the card. In another embodiment, the challenge and response check is performed if a threshold amount of time has elapsed since the user requested the card but is not performed otherwise. In another embodiment, such check is always performed.

In one embodiment, the fraud check may not be performed as part of step 546. In one embodiment, the fraud check is performed using the name of the merchant and a database of countries in which that merchant operates, with the fraud score being calculated based on the country in which the merchant operates that would produce the most favorable score, least favorable score or using an average of each score for each country in which the merchant operates. Merchants not listed in the database, may generate a high fraud score in one embodiment. The fraud check may omit the country of the destination of any goods or services as a factor, because it is not known, or it may be used if made part of the request.

If the card was issued more than the threshold amount of time ago, in one embodiment, the transaction is refused at step 552, described in more detail below. In another embodiment, no such requirement to use the card within a threshold amount of time is required, and step 544 does not include such a test.

In one embodiment, as part of step 546, if the attempt to charge the user's cell phone account is unsuccessful due to an insufficient prepaid balance, the user may be instructed (via the web site he or she may be using or via an SMS text message) that the prepaid balance is insufficient and requested to add additional funds to the cell phone account. A short wait period may be performed, such as ten minutes and then another attempt is made. After the failure of the second attempt, the attempt is considered unsuccessful at step 248. If the second attempt succeeds, the attempt is considered to be successful at step 548.

If the attempt is successful 548, either because the challenge and response check and the fraud check were both successfully passed as described above, and either sufficient funds were available in the subscriber's prepaid account or the subscriber has a postpaid account in good standing and the charge will not exceed any credit limit as described above, the charge is authorized and the merchant is so informed, via the card processor and payment processor, optionally via the transaction network, and the merchant performs the goods or services action for the goods and services corresponding to the transaction 550.

In one embodiment, a merchant identifier is part of the request and is communicated from the merchant to the cell phone payment processor with other information as described above. In one embodiment, the merchant identifier, and, if not already associated, the phone number and IMSI is associated with the credit card number as part of step 550. In this embodiment, if the card was not recently issued 544, if it is being used by a merchant for which it was associated as part of step 550 when it was previously used, and the merchant is a trusted merchant (e.g. one the cell phone payment processor believes will have a low incidence of fraud, for example, because the charges are usually low and the customers of that merchant are usually registered 554, the IMSI is requested 556 from the clearinghouse using the phone number associated with the card. If the IMSI for the phone number associated with the card is the same as that previously associated with the card 558, the cell phone account is charged as described above using some or all of steps 220-240 and 260-272. Thus, a user who does not use the card right away may nevertheless be allowed to continue using the card. The other information compared in step 542 is still required to pass the test as described above, or step 552 will still follow step 542 in this case.

Funding by User Request.

FIG. 5B is a flowchart illustrating a method of paying for a purchase of goods and/or services, such as those made via the Internet by a credit or debit card that is funded through a cell phone account by user specification according to one embodiment of the present invention. In this embodiment, the user transfers a requested amount from his or her cell phone account to a debit card. An additional fee may be charged or the amount added to the card may be less than the amount deducted from the cell phone account by the amount of a fee. The debit card may then be used in a conventional fashion to purchase the goods and services.

Referring now to FIG. 5B, steps 510-514 operate the same as the steps with the same number in FIG. 5A, except that prepaid debit card numbers are used instead of debit card or credit card numbers.

The user uses a web site or an SMS text message or USSD message to request a card number, and an amount to be added to the card, or specifies a card number to which an increase is desired, along with the amount of the increase 517. In one embodiment, the amount also includes a fee for the transfer that will not be added to the card but will be deducted from the subscriber's cell phone account and in another embodiment, such a charge is added to the user-specified amount. In still another embodiment, the user specifies the amount to be charged to the cell phone account, and the amount credited the card is reduced by a fee. In one embodiment, no fees are assessed for the transfer.

The cell phone payment processor receives the information provided in step 517 and attempts to charge the user's cell phone account as described above with respect to some or all of steps 220-240 and 260-272, however step 246 is replaced by step 537 or 539 as described in more detail below. The amounts charged and credited are those described above If the attempt to charge the user's cell phone account is successful (i.e. the subscriber optionally correctly responds to the challenge phrase and there is no fraud detected, and either the prepaid balance is sufficient or the subscriber's postpaid account is in good standing and any applicable credit limits have not been exceeded) 532, one of the above amounts is loaded onto the card (which includes loading the amount onto a stored value card, or loading the amount onto an account corresponding to the card) 534 and the user may use the card in a conventional fashion as described below.

If the attempt to charge the user's cell phone account is unsuccessful 532, in one embodiment, the user's request is refused, for example, by so indicating, using the manner the user used to make the request (e.g. via text message to the web site), or in a different manner 537, and the user may make another attempt at a different time, starting at step 517, or, if there are funds on an existing card, may perform step 520.

In one embodiment, instead of refusing the user at step 537, the user is notified that their prepaid balance is insufficient or their credit standing is not sufficient and the user is given time to correct the situation, for example, by paying their bill or adding more funds to their cell phone account 539. A second attempt is made at a later time, and the method continues at step 530, however, in one embodiment, if the second attempt is unsuccessful at step 532, step 537 is performed.

The user purchases goods and/or services at an online or other merchant and the transaction is processed as described above with respect to steps 520-524 and 540-542. (In the case of a stored value card, instead of steps 522, 524, 540 and 542, the value is deducted from the card if sufficient funds are stored on the card and a conventional security check is successful, or the transaction is refused otherwise) and the method continues at step 520 or 517.

If sufficient funds for the transaction are on the card or in the account corresponding to the card 545, payment is authorized to the merchant in the amount specified by the merchant in the request, less any fee, and the amount is deducted from the card or the card account 547. The fee may be in addition to the amount and so the total is deducted from the card or the card account. The method may continue at steps 520 or 517.

If sufficient funds are not on the card or in the account corresponding to the card 545, the transaction may be refused 562 and the method continues at step 517 or 520. In one embodiment, step 562 includes sending the user a text message reminding him or her to add funds to the card.

Although one user and one merchant are described above, the system and method of the present invention may be applied to multiple users and each user may use multiple merchants, some of which are shared by different users. All of the users employ multiple cell phone operators, some or all of which are shared by multiple users, and some or all users using different cell phone operators may use the same cell phone payment processor.

System.

Figure 6:
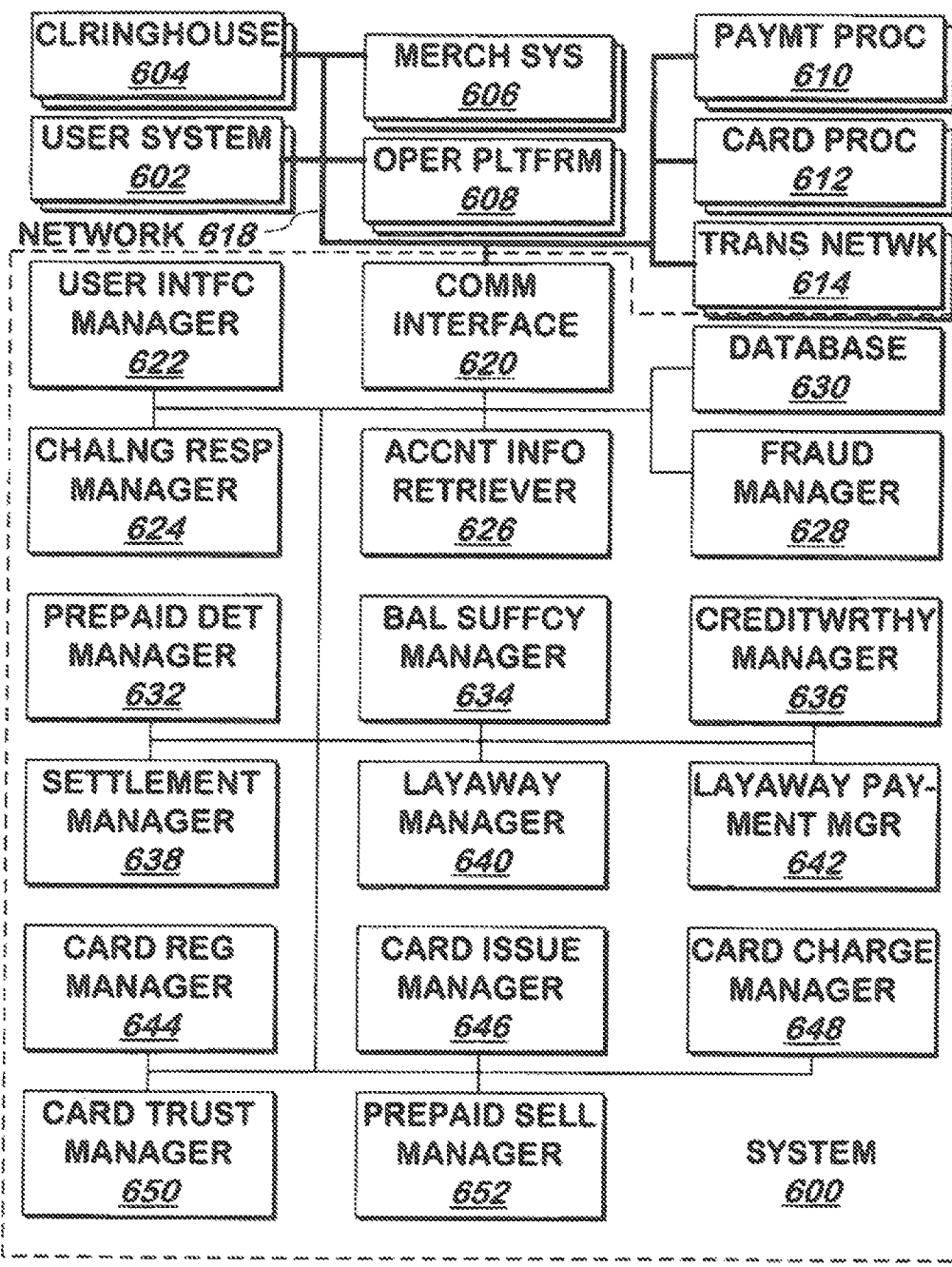
FIG. 6 is a block schematic diagram of a system for paying for goods or services using a cell phone account according to one embodiment of the present invention.

Referring now to FIG. 6, a system for paying an online merchant with a cell phone account is shown according to one embodiment of the present invention.

Communication interface 620 is a conventional communication interface running conventional communications protocols such as TCP/IP, Ethernet, and other conventional communications protocols. All communication into system 600, which includes the elements numbered 620 or above, is made via communication interface 620. Communication interface 620 is coupled to a network 618, such as an Ethernet, the Internet, or both, via at least one input/output.

The operator of at least some of system 600 is the cell phone payment processor, and such cell phone payment processor arranges with conventional clearinghouses to pretend to be or to be a conventional roaming services provider as described above.

User Purchases Products or Services and Checks Out.

Different cell phone subscribers as described above purchase products and services using user systems 602, which may be conventional computer systems, each running a browser, including mobile devices for which network services are supplied by cell phone operators (also referred to as cell phone service providers), from merchants via merchant systems 606, which may include conventional web servers running one or more web retailer applications to allow a user to purchase products or services, which may be modified as described herein.

When the user uses the above systems to check out, the merchant system 606 may direct the user's browser to a user interface supplied by user interface manager 622, which asks the user for his or her phone number, if the user selects payment by cell phone as the payment method as described above. As noted, the merchant system 606 may be the entity that requests the user's phone number and provides such information to user interface manager 622 via a conventional API it provides.

User interface manager 622 builds the phone number and other referrer information received with the phone number as described above (or such information may be supplied to user interface manager 622 via the API) into a payment record and provides the payment record to challenge response manager 624.

Challenge User and Check Response.

When challenge response manager 624 receives the payment record, it provides a challenge phrase to the user's cell phone using the cell number in the payment record as described above. User interface manager 622 provides a user interface to the user to enter the challenge phrase and receives it from the user via the Internet. Alternately, the merchant may request the challenge phrase and provide it to user interface manager 622 via the API. When user interface manager 622 receives the challenge phrase, it provides it to challenge response manager 624, which compares the challenge phrase received with the one it generated. If the two are different, it may signal user interface manager 622 to request it again until a threshold number of attempts have been made and failed, at which point, it provides the payment record to user interface manager 622 with an indication that the challenge phrase was not entered correctly. If the challenge phrases match, challenge response manager 624 provides the payment record to user interface manager 622 and an indication that the challenge phrase was entered correctly. In one embodiment, challenge response manager sets a timer when it provides the challenge phrase, and if the timer elapses before the phrase is received, challenge response manager 624 indicates to user interface manager that the challenge phrase did not match.

If it receives an indication that the challenge phrase was not entered correctly, user interface manager 622 indicates to the user that the challenge phrase was not entered correctly, and may then redirect the user's browser to an error page of the merchant system 606, and the merchant will not perform the goods or services action, the subscriber's cell phone account will not be charged and the merchant account will not be credited as a result. The redirect may include a merchant-issued transaction identifier received with the referrer information that the merchant can use to cancel the transaction or allow the user to use a different payment method or another attempt to pay by cell phone.

Returning Registered Users.

In one embodiment, the information communicated from the merchant via the referrer information or API may contain the identifier of the merchant and the registered username the user uses to log in at the merchant or the or an alternate username that is not the username but is an identifier unique to the merchant that will always be substituted by merchant system 606 in place of the username to identify the user to system 600 after the user logs in to the merchant system 606 using the user's username as described above. Such information will be made part of the payment record when received by user interface manager 622. The merchant system 606 may also provide to user interface manager 622 a $0 charge at the time of registration or another indication that the transaction is for purposes of registration as described above.

When challenge response manager 624 receives the payment record, it checks for a merchant identifier and a username or alternate username. If those two fields are found, it checks a username table for entries with the same phone number, merchant identifier and username or alternate username in a registered user table in database 630. If it does not find these items, challenge response manager 624 challenges the user and receives the response as described herein, and if the user provides the correct response, challenge response manager 624 operates as described above and builds an entry containing them in the username table and adds the current date and time as a timestamp.

As noted below, account information retriever 626 retrieves the account information described above, including the IMSI corresponding to the telephone number in the payment record. In one embodiment, such account information is retrieved prior to user interface manager 622 providing the payment record to challenge response manager 624, and challenge response manager adds the IMSI to the username table, associated with the username or alternate username and merchant name. In one embodiment, account information retriever receives a list of country codes and the cellular telephone service providers that service telephones with numbers having that country code, as well as an estimate or actual order of market share within that country code, and account information retriever 626 attempts to retrieve the account information from such providers in order or approximate order of the market share as described above.

If, at a subsequent time, it locates in the registered user table in database 630 the combination of merchant identifier, username or alternate username and phone number in a subsequent payment record, if the timestamp is not less than the current date and time by more than a threshold amount, challenge response manager 624 does not provide the challenge phrase or receive a response. Instead, challenge response manager 624 indicates that the user entered the challenge phrase correctly, in spite of the fact that the user did not do so because they were not requested to do so. In one embodiment, challenge response manager 624 also checks the IMSI in the payment record (which is retrieved by account information receiver 626 as described above) with the IMSI associated with the merchant identifier and username or alternate username in the username table, and does not provide the challenge phrase but instead indicates to user interface manager 622 that the user entered the challenge phrase correctly if a) the merchant identifier and username or alternate username in the payment record is located in the username table, b) the difference between the current time and the timestamp is less than a threshold amount of time, and c) the IMSI in the username table is the same as the IMSI in the payment record. Thus, at the time of a second request received from a merchant for payment via a cell phone account, the system will operate to charge the user's cell phone account, credit the merchant and initiate the merchant performing the goods or services action without verifying that the user has possession of the telephone corresponding to the telephone number it receives when a user has previously provided evidence of such possession, as long as the IMSI corresponding to the phone number is the same as it was at the time of a prior request from that merchant for payment or registration via the same cell phone account.

If the merchant name, username or alternate username, and phone number in the payment record match a row in the registered user table in database 630, but the timestamp is older than the current date and time by more than a threshold amount, or the IMSI in the payment record is different from the associated with the merchant identifier and username or alternate username in the username table, challenge response manager 624 causes the challenge phrase to be sent and compares the any response with the challenge phrase, and responds as described above. However, if the user enters the challenge phrase correctly, challenge response manager 624 updates the timestamp in the corresponding entry in the registered user table in database 630.

Retrieve Account Information from Clearinghouse.

Simultaneously with the challenge phrase being sent, or around that time, user interface manager 622 provides the payment record to account information receiver 626, which retrieves the information described above from the computer system of the clearinghouse 604 as described above and adds it to the payment record. Account information receiver 626 provides such updated payment record to user interface manager 622.

Check for Fraud, Bad Account Status, and Chargebacks.

If user interface manager 622 receives the indication that the challenge phrase was entered correctly, user interface manager 622 adds the IP address of the user to the payment record and provides the updated payment record to fraud manager 628.

When it receives the updated payment record, fraud manager 628 performs the fraud check, status check and chargeback check (checking the chargeback table in database 630 described in more detail below, for the user's IMSI) as described above. In one embodiment, to perform the fraud check, fraud manager 628 locates the country corresponding to the IP address in a country/IP address table stored in database 630. Fraud manager 628 uses the county of the merchant and the country in which goods are being shipped that was received in the referrer information and is stored in the payment record, and uses the country in which the cell phone last operated that was retrieved from the clearinghouse and stored in the payment record to calculate a fraud score as described above.

If the fraud score is on one side of a threshold, the account status is bad (suspended or disabled) or the number of applicable chargebacks during a period of time exceeds a threshold for the merchant (the threshold for each merchant is stored in the merchant table of database 630, with a default value of two per year if no different threshold and period is specified by the merchant) and chargebacks are stored associated with the IMSI as described herein) the transaction is considered fraudulent or suspicious, and so fraud manager 628 so indicates, and provides the payment record, to user interface manager 622. In response, user interface manager 622 refers the user back to an error page of the merchant system 606 or indicates to the merchant via the API using the transaction identifier as described above. The merchant can then refuse to perform the goods or services action and take other suitable measures, the subscriber's cell phone account will not be charged and the merchant's account will not be credited.

If the fraud score is on the other side of the threshold, the account status is not suspended or disabled and the number of chargebacks does not exceed the threshold, fraud manager 628 may log, in a fraud table in database 630, the different countries and time of day and a unique transaction identifier that may be assigned and added to the payment record by user interface manager 622 when it creates the payment record, to allow the fraud model to be refined based on the payment histories of the transactions. Fraud manager 628 additionally so indicates that fraud is not detected, the account status is not suspended or disabled and the number of chargebacks does not exceed the threshold (and provides the payment record) to user interface manager 622.

Determine Prepaid/Postpaid Type of Account.

When it receives this indication of no detected fraud, the account status is not suspended or disabled and the number of chargebacks does not exceed the threshold, user interface manager 622 provides the payment record to prepaid determination manager 632. When it receives the payment record, prepaid determination manager 632 determines whether the user's account is a prepaid account or a postpaid account as described above. To make this determination, prepaid determination manager 632 uses the operator identifier stored in the payment record to locate the contact information instructions for that operator in the operator table of database 630 and then contacts the operator platform or platforms 608 or clearinghouse system 604 according to the contact information, performs the instructions, and interprets the results according to the interpretation information for that operator in the operator table of database 630 as described above. Prepaid determination manager 632 stores an indication as to whether the subscriber is prepaid or postpaid in the payment record and provides the payment record to user interface manager 622. The operator platform 608 and clearinghouse system 604 are conventional computer systems, such as web servers.

When it receives the payment record, user interface manager 622 provides the payment record to balance sufficiency manager 634 if the account is indicated in the payment record as being prepaid, and to creditworthy manager 636 otherwise.

Check Prepaid Balance.

When balance sufficiency manager 634 receives the payment record, it uses the instructions for retrieving the prepaid balance for the operator in the payment record that are stored in the operator table of database 630 to contact the appropriate operator platform or platforms 608 or clearinghouse system 604 and retrieves the prepaid balance using the phone number in the payment record. Balance sufficiency manager 634 subtracts any minimum amount that is indicated in the operator table of database 630 and balance sufficiency manager 634 indicates to user interface manager 622 whether the remainder is greater than or equal to the amount of the charge in the payment record (plus any extra fees) and may store the excess in the payment record. Balance sufficiency manager 634 provides the payment record and indicates to user interface manager 622 whether the remainder is greater than or equal to the remainder, and may also reserve or place a hold at the operator platform 608 on the amount to be charged the cell phone account in the operator platform or with the clearinghouse. Balance sufficiency manager 634 stores in the payment record the amount of the hold or reservation.

Check Creditworthiness.

When it receives the payment record, creditworthy manager 636 compares the amount in the payment record to a credit limit, either a credit limit that applies to all operators or one that applies to the operator in the payment record in the operator table in database 630 and if the credit limit is exceeded by the amount (or other conditions in the operator table or elsewhere in the database 630 are not met, e.g. that it is not on a blacklist of phone numbers, etc.), then creditworthy manager 636 provides the payment record and so indicates to user interface manager 622.

If the credit limit is not exceeded and other conditions are met, creditworthy manager 636 then uses the instructions stored in the operator table of database 630 for the operator corresponding to the payment record to determine the location of the operator platform 6011 or clearinghouse system 604, the method of identifying the creditworthiness of the account and instructions for interpreting the results, and then uses such information and the phone number in the payment record to identify whether the account is creditworthy as described above. Creditworthy manager 636 provides the payment record and such information to user interface manager 622.

Insufficient Balance/Not Creditworthy.

In one embodiment, either balance sufficiency manager 634 or creditworthy manager 636 stores an indication as to whether the issue was an insufficient balance or the creditworthiness of the account into the payment record and provides the payment record to user interface manager 622 as the signal as described above.

If it receives an indication that the prepaid balance is insufficient or that the postpaid account is not creditworthy, user interface manager 622 so indicates to the user and then redirects the user to an error page on the merchant system 606, with referrer information including the merchant's transaction number in the payment record, or to the merchant system via the API as described above, and user interface manager 622 or the merchant system 606 may suggest to the user suitable corrective measures, such as topping up the account by the difference stored in the payment record.

Prepaid Balance Sufficient or Postpaid Account is Creditworthy.

If it receives an indication that the prepaid balance is sufficient or the postpaid account is creditworthy, user interface manager 622 provides the payment record to settlement manager 638. When it receives the payment record, settlement manager 638 builds the information from the payment record into an entry as described above and provides the entries as records as described above to clearinghouse system 604, which processes them as described above. Settlement manager 638 commits or releases the hold as required. In addition, settlement manager 638 also builds and stores in an operator accounting table in database 630 a row corresponding to the transaction, including the current date and time, operator identifier and amount, and builds and stores in a merchant accounting table in database 630 a row that contains the merchant identifier, date and time and amount. Other conventional accounting steps pertaining to settlement and described herein may also be performed by settlement manager 638, including clearinghouse system 604 providing the tap records for an operator to the operator platform 608, and as a result, the operator platform 608 charges each user's account in the manner of a roaming service charge.

Settlement manager 638 may assign a transaction identifier, and stores it in both such rows and into the payment record, and provides the payment record to user interface manager 622 with an indication that the transaction is complete. User interface manager 622 provides the transaction identifier, encrypted and signed, via the API, or redirects the user back to the merchant site, optionally with referrer information including the merchant transaction number and the assigned transaction identifier, which user interface manager 622 encrypts and signs. When the merchant system 606 receives the signed transaction identifier, it authenticates the signature, and if authentic, causes the goods or services action to be performed, such as by displaying a shipping order to a shipping department, or indicating to a service provider to provide the service.

Less Verification for Repeat Transaction.

In one embodiment, settlement manager 638 timestamps with the current date and time and stores some or all of the payment record into a paid transactions table in database 630.

At a later time, after the same user initiates another transaction with the same merchant or a different merchant, user interface manager 622 may proceed as described herein. However, if the amount is under a threshold amount, and the same telephone number is received for a transaction as was used for a prior transaction in the paid transactions table, and the IMSI from the most recent payment record stored in the paid transactions table having the same phone number matches the current IMSI retrieved for that phone number and stored in the payment record for the transaction being processed, and the timestamp of the most recent record stored in the paid transactions table is less than a threshold amount of time from the current time retrieved by user interface manager 622, and if the merchant is trusted, (or fewer than the above conditions are satisfied) user interface manager 622 may add a field to the payment record indicating the payment record was unverified and provide the payment record to settlement manager 638 without providing the payment record to balance sufficiency manager 634 or creditworthy manager 636 so that the payment is processed without regard to balance sufficiency or creditworthiness as described above with reference to FIG. 4 above.

In one embodiment, only a limited number of transactions for a subscriber from the last transaction in which balance sufficiency or creditworthiness was checked for that subscriber will be processed in this manner, at which point the balance sufficiency or creditworthiness will be checked as described above. In one embodiment, only a limited number of transactions from a subscriber within a time period (e.g. one month or a typical billing cycle) will be processed without checking for creditworthiness or balance sufficiency, and if the limited number is exceeded by a subscriber, user interface manager 622 checks that transaction and all subsequent transactions during the period from that subscriber for balance sufficiency or creditworthiness as described above.

Layaway.

In one embodiment, if the prepaid balance is insufficient or the user is not considered creditworthy because the user's account is not in good standing, user interface manager 622 will ask the user via the web or their mobile device as described above if they would like time to correct the situation. In one embodiment, as described above, the user need not respond for the following actions to be taken, and in another embodiment, a user indication as to whether to proceed is requested and received by user interface manager 622. Either automatically, or if the user so indicates, user interface manager 622 provides the payment record to layaway manager 640 and may inform merchant system 606 to place the transaction on hold pending payment, either via the API or by opening a session with the merchant system that identifies the transaction on hold using the merchant transaction identifier in the payment record. The merchant system 606 may respond by holding the user's shopping cart open for a longer period of time than it otherwise would, but does not perform the goods or services action.

Alternatively, the merchant system 606 may so inform the user, having received an indication that such an option is available via user interface manager 622 via the API, and if the user responds affirmatively, the merchant system 606, so informs user interface manager 622 via the API, and user interface manager 622 provides the payment record to layaway manager 640.

In one embodiment, layaway manager 640 assigns a transaction identifier (which may be the merchant name and its identifier) and an expiration date and time to the transaction and stores the identifier, the current date and time, and the payment record in a layaway table in database 630. The expiration date and time optionally is a function of the indication of the issue (creditworthiness or insufficient balance) stored with the payment record as described above, with creditworthiness issues having a longer date and time from the current date and time than those with an insufficient prepaid balance, in one embodiment.

Layaway payment manager 642 periodically scans the layaway table for expiration dates and times that are prior to the current date and time, i.e. expired. For any that it finds expired, layaway payment manager 642 retrieves the payment record, increments a counter that was initialized to zero when the payment record was built, provides the payment record to user interface manager 622 and deletes the corresponding row in the layaway table in database 630.

When it receives the payment record from layaway manager 642, user interface manager 622 again sends the payment record to prepaid determination manager 632, and processing then occurs from that point on as described above. In one embodiment, user interface manager 622 provides the payment record to balance sufficiency manager 634 or creditworthiness manager 636 based on the type of account stored in the payment record instead of providing it to prepaid determination manager 632, and processing continues from either of those points as described above.

If balance sufficiency manager 634 or creditworthiness manager 636 indicates that the prepaid balance remains insufficient or that the postpaid account is not creditworthy as described above, user interface manager 622 checks the counter and compares it to a threshold. If the counter exceeds the threshold, user interface manager 622 informs the user, the merchant or both that the prepaid balance was insufficient or the postpaid account was determined to be not creditworthy and the user is instructed to address such issue and start again, or to select another mode of payment (e.g. credit card or check) as described above, but the payment record is not provided to layaway manager 640, and processing of the payment record continues as described above.

If the counter does not exceed the threshold, user interface manager 622 again provides the payment record to layaway manager 640, which processes it as described above. In one embodiment, user interface manager will inform the user, for example via text message or the web site, that the prepaid balance remains insufficient or the postpaid account remains not in good standing after another attempt and asks if the user needs more time to correct the issue. User interface manager 622 processes the response as described above.

In one embodiment, user interface manager 622 requests a payment schedule from the user via the web interface it provides or allows the merchant system 606 to do so, and merchant system 606 communicates payment schedule information (e.g. the number of equal monthly installments) to user interface manager 622. User interface manager 622 adds the payment schedule information to the payment record before providing it to layaway manager 640, which adds the next payment date as the expiration date. Layaway payment manager 642 retrieves the payment record at the next scheduled payment date (i.e. the expiration date), and provides the payment record to user interface manager 622, which provides it to prepaid determination manager 632 as described above and processing continues from that point as described above. The amount of the charge that will be checked against the balance for sufficiency for a prepaid account by balance sufficiency manager 634, compared against the credit limit by creditworthy manager 636, or charged to the user's account by settlement manager 638 is the next scheduled payment amount. Settlement manager 638 maintains the amounts paid for the transaction in a layaway table in database 630 and only when the transaction is paid in full does settlement manager 638 provide the payment record to user interface manager 622 with the indication that the transaction is complete. At each monthly payment prior to the last one, settlement manager 638 updates the amount due and the next scheduled payment and provides the payment record to layaway manager 640, which assigns the next scheduled payment date as the expiration date and stores it as described above. If a payment is not completed because the prepaid balance is insufficient or a postpaid account is not creditworthy, settlement manager 638 proceeds as described above, to cause the notification of the subscriber to remedy the issue.

Chargebacks.

Chargebacks are transactions initiated by the merchant for a customer return with a negative amount. If a negative amount is received by user interface manager 622, user interface manager 622 passes the payment record to settlement manager instead of providing it to balance sufficiency manager 634 or creditworthy manager 636. Settlement manager 638 processes chargebacks in the same manner as described above, but the amounts are negative or otherwise indicated as such, and settlement manager 638 stores the IMSI, date, time and amount of the chargeback into a chargeback table in database 630.

On Demand Credit or Debit Card.

As noted above, for merchants who do not provide or receive the information described above, a credit or debit card that is funded by the user's cell phone account may be used instead. The system provides card information to the user for the user to use like any other credit card or debit card, and processes charges to the user's cell phone account, as will now be described.

Card registration manager 644 requests and receives card numbers from transaction network system 614 optionally via card processor system 612 and an issuing bank. Transaction network system 614 and card processor system 612 are each conventional computer systems including conventional web server software. Transaction network system 614 registers the card numbers to card processor system 612 and card processor system 612 registers the card numbers to cell phone payment processor system 600, each of which includes a conventional computer system including a web server. Card registration manager 644 stores the card numbers into a card table in database 630.

Transaction network system 614 is operated by a transaction network such as Visa or Mastercard. Card processor system 612 is operated by a company that handles credit and/or debit processing for and payment processor system 610

At any time, users may request a card to be issued to them as described above. To do so, the user uses user system 602 to communicate with card issue manager 646, for example via a mobile device or web page as described above. When the user does so, card issue manager 646 requests and receives the IMSI for the phone number received as described above from account information retriever 626, which retrieves the IMSI and provides it to card issue manager 646. Card issue manager 646 associates with the user's cell phone number and the IMSI one of the card numbers in the card table of database 630 that is not already associated with a user's cell phone and provides the card information to the user as described above. In one embodiment, the expiration date and security code are generated by card issue manager 646 and stored in the database associated with the card number. In one embodiment, card issue manager 646 also associates the current date and time with the card number.

The user then uses user system 602 to purchase goods and/or services from merchant system 606 using conventional techniques, and checks out using the card information received as described above. The merchant system sends a request for payment, including the card information and the amount of the charge to payment processor 610, which includes a conventional computer system, and may include a conventional web server. Payment processor 610 either sends the request to transaction network system 614, which forwards it to card processor 612 based on the registered card number, or sends the card number to transaction network 614, which identifies to payment processor 610 card processor 612 as the entity to process the transaction, and payment processor 610 sends the request to card processor 612.

When it receives the request, card processor 612 uses the card number to identify the cell phone payment processor 600 as the issuing financial institution and forwards the request to card charge manager 648. Card charge manager 648 uses the card number to check the other information received in the request with the other information stored in the card table of database 630 for the card number (expiration date and security code), and ensures it matches. If it does not match or the card number is not located, card charge manager 648 rejects the request by sending an identifier received with the request to card processor 612, which sends it to payment processor 610 optionally via the transaction network system 614. Payment processor 610 sends the rejection to the merchant system 606, and the merchant may allow the user to make other payment arrangements but does not receive payment and does not perform the goods or services action as a result of the request.

If the other information matches, card charge manager 648 builds a payment record consisting of the information in the request, including the amount being charged by the merchant from the request and the cell phone number and IMSI associated with the card number in the request, and, in one embodiment, checks to see if the card was recently issued. In one embodiment, if the card was not recently issued, card charge manager 648 so indicates in the payment record. Card charge manager 648 also marks the payment record to indicate that responses to the payment record as described below are to be sent to charge card manager 648. In one embodiment, if the card was not recently issued, card charge manager 648 sends the payment record to challenge response manager 624 which proceeds as described above and provides the indication to card charge manager 648. If the challenge phrase was entered incorrectly, card charge manager 648 may repeat the process to retry up to a number of times and if still entered incorrectly, card charge manager 648 rejects the request as described above. If it receives the indication that the challenge phrase was entered correctly, card charge manager 648 continues as described below. In another embodiment, if the card was not recently issued, card charge manager 648 provides the payment record to card trust manager 650 for processing as described below. If the card was recently issued or the challenge phrase was entered correctly, card charge manager 648 provides the payment record to account information retriever 626 which retrieves the account information as described above, places it into the payment record and provides the payment record to card charge manager 648. Card charge manager 648 provides the payment record to prepaid determination manager 632, which makes the determination described above, adds the indication of whether the user's account is prepaid or postpaid to the payment record and provides the payment record to card charge manager 648. When it receives the payment record, card charge manager 648 uses the indication of whether the user's account is prepaid or postpaid to provide the payment record to balance sufficiency manager 634 or creditworthy manager 636 in the same manner as user interface manager 622 described above, balance sufficiency manager 634 or creditworthy manager 636 operate as described above and provide the payment record, including the selected one's respective indication, to card charge manager 648.

If the indication is that the prepaid balance is insufficient or the account is not in good standing, in one embodiment, card charge manager 648 provides the payment record to layaway manager 640, which proceeds as described above, to prompt the user to correct the issue and layaway payment manager 642 will operate as described above and will signal card charge manager 648 at the expiration date and time (which may be shorter in this case than it would be if the charge was coming directly from merchant system 606 as described above) to repeat the process starting with the account information being retrieved. The number of attempts it makes may be limited to one. If the attempts fail, or, in another embodiment, if the original indication is that the prepaid balance is insufficient or the account is not in good standing, in one embodiment card charge manager 648 rejects the charge as described above.

If the indication in the payment record is that the prepaid balance is sufficient or the user's account is creditworthy, card charge manager 648 provides the payment record to settlement manager 638, which charges the user's cell phone account as described above, and uses the card identifier as the merchant for accounting purposes as it stores entries in the database as described above. Card charge manager 648 builds and sends an approval of the charge to card processor 612, which sends it to payment processor 610, optionally via transaction network system 614. Payment processor 610 notifies the merchant system 606, which causes the merchant to perform the goods or services action as described above.

In one embodiment, card charge manager 648 associates with the card number in database 630 the merchant from the request and the IMSI retrieved as described above. In such embodiment, if, at a subsequent time the card is used, the card is not recently issued, but the merchant in a request is the same as one associated with the card from a prior transaction to that card, and the merchant name matches a merchant from a trusted merchant table in database 630, the request will be processed, optionally without the use of challenge response manager 624 and will instead be treated as if the challenge phrase was entered correctly. In another embodiment, challenge response manager 624 is used as described above if the merchant is in the trusted merchant table, but the transaction will not be refused. If the merchant is not in the trusted merchant table, the transaction may be refused by card charge manager 648, or challenge response manager 624 may be used as described above. In one embodiment, if challenge response manager 624 is not ordinarily used for a trusted merchant, and in another embodiment, if the card is not recently issued and challenge response manager 624 is used, card charge manager 648 compares the IMSI retrieved by account information retriever 626 and stored in the payment record with the IMSI associated with the card in database 630. If the two IMSIs do not match, either challenge response manager 624 will be used by card charge manager 648 as described above or the transaction may be refused by card charge manager 648 as described above.

Manual Purchase and Reload of Card.

As noted above, in one embodiment, the user may purchase a prepaid debit card or add value to a previously purchased card.

Purchase or Adding Value to a Prepaid Card.

In such embodiment, a user may purchase, or increase the stored value on, a prepaid debit card by navigating a browser on the user system 602 to a web page provided by, or sending a text message (which includes SMS messages and USSD messages) to, prepaid sell manager 652. The user includes the amount desired to add to the card or amount to charge to the user's cell phone account, the card number if adding funds to an existing card, and the user's cell phone number if the web page is used (prepaid sell manager 652 will receive the user's phone number as part of the text message if that is used).

If the user is purchasing a new card, prepaid sell manager 652 associates one of the card numbers in the card table in database 630. In one embodiment, debit and credit card numbers are segregated, with each type requested and received as described above, and card registration manager 644 marks the type of card in the row for that card in the card table in database 630. Prepaid sell manager 652 associates a prepaid cards not already associated with a user's cell phone. Prepaid cell manager 652 may request the user enter a username and password, or instruct the user to send a USSD message from their mobile device, which may be part of the user system 602.

Prepaid sell manager 652 then uses the API to communicate the user's phone number and the amount the user indicated to add to the card or charge to their cell account to user interface manager 622 as described above, with prepaid sell manager 652 acting as the merchant and using a merchant name. In one embodiment, if the user has authenticated itself to prepaid sell manager using a username and password, the username or alternate username are provided as part of the API, with a trusted merchant name to avoid the use of the challenge phrase (or a "supertrusted merchant name" which will cause challenge response manager 424 to skip the challenge phrase even for the first use by that user), or they need not be provided and the merchant name is a name that is not trusted, so that the challenge phrase will be provided as part of the use of the API as described above. If an error is returned by user interface manager 622 (for example, because the user did not correctly enter the challenge phrase, the prepaid balance is insufficient or the postpaid account is not in good standing, prepaid sell manager 652 so indicates to the user and suggests the user correct the issue and try again. Layaway manager 640 and layaway payment manager 642 may perform this function in the manner described above and automatically initiate the retry as described above. If the charge is made to the user's account, user interface manager 622 informs prepaid sell manager 652 as described above, and prepaid sell manager 652 increases by the amount of the charge (less any fee) in the row in the card table corresponding to the card number in database 630 an available balance amount, initialized to zero by card registration manager 644. Prepaid sell manager 652 provides the card number to the user (or provides it if the card is being newly issued or had a zero balance) and indicates that the amount is available to be used.

Using the Prepaid Card.

The user uses a prepaid card as described above. However, if there is a balance on the card, card charge manager 648 will first use the balance on the card before attempting to charge the user's cell phone account as described above. In one embodiment, when a prepaid card is purchased, prepaid sell manager 652 may mark the row in the card table in database 630 as prohibiting automatic charges, for example, if the user so requests such status from prepaid sell manager 652 when the card is purchased or value is added to the card. In such embodiment, card charge manager 648 will not automatically attempt to charge the user's cell phone account if a charge is received from a merchant that is in excess of the amount of the prepaid value remaining on the card and the row corresponding to the card number in the card table in database 630 indicates that automatic charges are prohibited. In such case, the charge will be refused, and the user may be so informed by card charge manager 648, which instructs the user to add value to the card and try again.

In one embodiment, special field is used in the payment record when on demand or prepaid credit cards are used, which indicates to fraud manager 628 not to perform the fraud check, or to perform it using conventional credit or debit card fraud detection techniques. The merchant name may be copied from the request into the payment record by card charge manager 648 for use by fraud manager 628.

When the merchant is paid via the on demand credit card or the cell phone account-linked debit card described above, the merchant will perform the goods or services action as described above, and will not perform it in response to submission of the card information if payment is refused, until payment is received either from such card or another form of payment. In one embodiment, a goods or services action does not include supplying cell service- or mobile device-related services or mobile device-related products.

Thus, a system and method allows for a user to pay a merchant to perform a goods or services action using a cell phone account or a credit or debit card that is funded by a cell phone account. Funding is performed by charging as if a roaming service had been provided, when in fact none was provided for that customer or the roaming service charged was not provided. A cell phone account is an account that is used to provide mobile communication services.

Funding is performed by the user or a merchant explicitly specifying at least one decimal number containing, at least for some amounts, an amount other than zero to the right of the decimal place. Explicit specification means the transmission of that number. For example, specifying $0.10. Specifying "one" unit of a limited number of amounts that is much fewer (e.g. less than half) than all possible amounts, such as $0.10 is not considered explicit specification in one embodiment. In one embodiment, "specification of an exact amount" is made using a single (or very few) requests that can specify any or most amounts within a range, for example a range exceeding $5.00 or 5 euros from the lowest amount to the highest amount. For example, if one may specify any even numbered amount between $0.10 and $10, and optionally add a penny, that is specification of an exact amount, in spite of the fact that amounts outside the range are not possible and an extra penny must be specified for odd amounts. In one embodiment, specification of an exact amount does not include sending more than a few separate requests to specify any permissible amount within a range, or specification systems that do not allow specification of at least half the amounts within the range. So, for example, having to send a request for each $1 and each $0.10 is not specification of an exact amount, because the amount of $5.93 requires many request and also does not allow the $0.03 to be specified at all. Either one of these reasons would disqualify such a system as being one in which specification of an exact amount is allowed in one embodiment.

In one embodiment, any utility may be used in place of a cell phone account. For example, an electric account may be used.

Although two clearinghouse systems 604, two user systems 602, two merchant systems 606, two operator platforms 608, two payment processors 610, two card processors 612 and two transaction networks 614 are shown, any number of these may be used, and each may operated by entities that are different from one another (and not controlled by or controlling one another) and different from (and not under control of or controlling) the entity operating cell phone payment processor system 600.

Communication with Operators.

In the circumstance in which communication is made with operator platform 608 as described above, message formats are received from the operator and typically communicated using HTTP messages. In some cases, multiple platforms from the same operator may be used to obtain the information and provide the charge information described above. In this case, a single box behind the operator's firewall may be used to receive each message, direct it to the appropriate operator platform based on the content of the message, and return any response to the source of the message.

In one embodiment, a user may be directed to send a USSD message wherever the user is instructed to send a text message. For example, the user may be directed by challenge response manager 624 via a text message to type *24 or #24 on his or her cell phone. The operator platform 608 will receive the USSD message and provide an indication that such a message was received from the subscriber, along with the subscriber's phone number, to communication interface 620, which will route such message to challenge response manager 624. In one embodiment, the indication contains the number that was used, and this number is used to route the indication by communication interface 620.

Summary.

There has been described a method of paying for a product or service, including the steps of: at a first time, receiving from a merchant by a payment processor that is a sineroaming roaming services provider, an account identifier for a user at that merchant, and a telephone number of the user as a request for payment to the merchant by the sineroaming roaming services provider; verifying that the user has possession of the telephone corresponding to the telephone number received; associating the telephone number with the account identifier responsive to the verifying that the user has possession of said telephone; at a second time, subsequent to the first time, receiving by the payment processor an amount from the merchant for the product or service, other than roaming or another mobile-related product or service and at least one selected from the account identifier and the telephone number; responsive to the account identifier or telephone number or both received at second time, determining whether the telephone number was associated with the account identifier; generating, to a mobile telephone account corresponding to the telephone number received, a roaming charge responsive to the amount without verifying that said user has possession of said telephone between the second time and the generating step; causing the merchant to perform a goods or services action without verifying that said user has possession of said telephone between the second time and the causing the merchant to perform step; and causing the merchant to be provided funds responsive to the amount without verifying that said user has possession of said telephone between the second time and the causing the merchant to be provided step.

The above method may be performed, where at least one selected from the generating and both causing steps are responsive to the determining step.

The above method may be performed with the additional step of associating an identifier of the merchant with at least one selected from the telephone number and the account identifier.

The above method may be performed with the additional steps of, at the merchant, at each of the first time and the second time: receiving a user identifier from the user;

converting the user identifier received into the account identifier, the user identifier received from the user being different from the account identifier; and providing the account identifier to a payment processor.

The above method may be performed when, at the first time, the merchant indicates that the user is being registered.

The above method may be performed with the additional steps of: obtaining a first international mobile subscriber identity code responsive to the telephone number received at the first time; obtaining a second international mobile subscriber identity code responsive to the telephone number received at the second time; and comparing the first international mobile subscriber identity code and the second international mobile subscriber identity code; and where at least one selected from the generating and both causing steps are responsive to the comparing step.

The above method may be performed with the additional steps of: obtaining a first international mobile subscriber identity code responsive to the telephone number received at the first time; obtaining a second international mobile subscriber identity code responsive to the telephone number received at the second time; and comparing the first international mobile subscriber identity code and the second international mobile subscriber identity code; and where at least one selected from the generating and both causing steps are responsive or additionally responsive to the comparing step.

A system is described for paying for a product or service, the system including a user interface manager having at input for receiving, at a first time, from a merchant requesting payment from a payment processor that is a sineroaming roaming services provider, an account identifier for a user at that merchant, and a telephone number of the user, the user interface manager for providing at an output the telephone number received at the first time and the account identifier received at the first time; a challenge response manager having an input coupled to the user interface manager output for receiving the telephone number received at the first time, the challenge response manager for verifying via an input/output that the user has possession of the telephone corresponding to the telephone number received at the first time and for, responsive to the user having possession of said telephone, associating, via an input/output, the telephone number received at the first time with the account identifier received at the first time; and where the user interface manager is additionally for, at a second time, subsequent to the first time, receiving via the user interface manager input, the account identifier and an amount from a merchant for the product or service, other than roaming or another mobile-related product or service, and additionally for outputting the amount, and account identifier or telephone number or both, received at the second time; and where the challenge response manager input is additionally for receiving the account identifier, telephone number or both, received at the second time, and the challenge response manager is additionally for determining via the challenge response manager input/output whether the telephone number was associated with the account identifier, at least one of which was received at the second time, and for providing at the challenge response manager output an indication responsive to said determining; additionally including a settlement manager having an input coupled to the user input manager output for receiving the telephone number and the amount, the settlement manager for generating at an output, to a mobile telephone account corresponding to the telephone number received at the settlement manager input, a roaming charge responsive to the amount, without the system verifying that said user has possession of said telephone between the second time and a time corresponding to the generating of the roaming charge, and for causing via the settlement manager output, the merchant to perform a goods or services action, without the system verifying that said user has possession of said telephone between the second time and a time corresponding to the causing the merchant to perform, and for causing via the settlement manager output, the merchant to be provided funds responsive to the amount, without the system verifying that said user has possession of said telephone between the second time and a time corresponding to the causing the merchant to be provided.

The system may additionally operate as follows: the user interface manager input is additionally coupled to the challenge response manager output for receiving the indication; and the user interface manager provides the amount and account identifier, telephone number or both, to the settlement manger responsive to the indication.

The system may additionally operate as follows: the user interface manager additionally receives an identifier of the merchant at the user interface manager input; the user interface manager is additional for providing the merchant identifier at the user interface manager output; the challenge response manager input is additionally for receiving the merchant identifier, and the challenge response manager additionally associates an identifier of the merchant with at least one selected from the telephone number and the account identifier.

The system may additionally have, a merchant system having an input for receiving a user identifier from the user near each of the first time and the second time, the merchant system for converting the user identifier received at each of the first time and the second time into the account identifier, the user identifier received from the user being different from the account identifier, and for providing the account identifier at an output coupled to the user interface manager input, at each of the first time and the second time.

The system may additionally operate where the merchant system is additionally for providing at the merchant system output at the first time, an indication that the user is being registered.

The system may additionally have an account information retriever having an input coupled to the user interface manager output for receiving the telephone number, the account information retriever for obtaining via an input/output a first international mobile subscriber identity code responsive to the telephone number received at the first time and for obtaining a second international mobile subscriber identity code responsive to the telephone number received at the second time and for providing the first international mobile subscriber identity code and the second international mobile subscriber identity code at an output; and where the challenge response manager input is additionally coupled to the account information retriever output for receiving the first international mobile subscriber identity code and the second international mobile subscriber identity code, the challenge response manager is additionally for comparing the first international mobile subscriber identity code and the second international mobile subscriber identity code; and the challenge response manager provides the indication additionally responsive to the comparing.

The system may additionally have an account information retriever having an input coupled to the user interface manager output for receiving the telephone number, the account information retriever for obtaining via an input/output a first international mobile subscriber identity code responsive to the telephone number received at the first time and for obtaining a second international mobile subscriber identity code responsive to the telephone number received at the second time and for providing the first international mobile subscriber identity code and the second international mobile subscriber identity code at an output; and where: the challenge response manager input is additionally coupled to the account information retriever output for receiving the first international mobile subscriber identity code and the second international mobile subscriber identity code, the challenge response manager is additionally for comparing the first international mobile subscriber identity code and the second international mobile subscriber identity code; and the challenge response manager provides the indication additionally responsive to said comparing.

A computer program product is described including a computer useable medium having computer readable program code embodied therein for paying for a product or service, the computer program product including computer readable program code devices configured to cause a computer system to: at a first time, receive by a payment processor that is a sineroaming roaming services provider from a merchant different from, not under control of and not controlled by the payment processor, an account identifier for a user at that merchant, and a telephone number of the user as a request for payment to the merchant by the payment processor, verify that the user has possession of the telephone corresponding to the telephone number received; associate the telephone number with the account identifier responsive to the verifying that the user has possession of said telephone; at a second time, subsequent to the first time, receive by the payment processor an amount from the merchant for the product or service, other than roaming or another mobile-related product or service and at least one selected from the account identifier and the telephone number; responsive to the account identifier or telephone number or both received at second time, determine whether the telephone number was associated with the account identifier; generate, to a mobile telephone account corresponding to the telephone number received, a roaming charge responsive to the amount without verifying that said user has possession of said telephone between the second time and operation of the computer readable program code devices configured to cause the computer system to generate; cause the merchant to perform a goods or services action without verifying that said user has possession of said telephone between the second time and operation of the computer readable program code devices configured to cause the computer system to cause the merchant to perform; and cause the merchant to be provided funds responsive to the amount without verifying that said user has possession of said telephone between the second time and operation of the computer readable program code devices configured to cause the computer system to cause the merchant to be provided.

The computer program product may include a feature wherein at least one selected from the computer readable program code devices configured to cause the computer system to generate and both computer readable program code devices configured to cause the computer system to cause are responsive to the computer readable program code devices configured to cause the computer system to determine.

The computer program product may additionally include associating an identifier of the merchant with at least one selected from the telephone number and the account identifier.

The computer program product may additionally include computer readable program code devices configured to cause the computer system to, at the merchant, at each of the first time and the second time: receive a user identifier from the user; convert the user identifier received into the account identifier, the user identifier received from the user being different from the account identifier; and provide the account identifier to a payment processor.

The computer program product may additionally include computer readable program code devices configured to cause the computer system to, at the first time, indicate at the merchant that the user is being registered.

The computer program product may additionally include computer readable program code devices configured to cause the computer system to: obtain a first international mobile subscriber identity code responsive to the telephone number received at the first time; obtain a second international mobile subscriber identity code responsive to the telephone number received at the second time; and compare the first international mobile subscriber identity code and the second international mobile subscriber identity code; and an additional may be at least one selected from the computer readable program code devices configured to cause the computer system to generate and both of the computer readable program code devices configured to cause the computer system to cause are responsive to the comparing step.

The computer program product may additionally include computer readable program code devices configured to cause the computer system to: obtain a first international mobile subscriber identity code responsive to the telephone number received at the first time; obtain a second international mobile subscriber identity code responsive to the telephone number received at the second time; and compare the first international mobile subscriber identity code and the second international mobile subscriber identity code; and an additional feature may be that at least one selected from the computer readable program code devices configured to cause the computer system to generate and both of the computer readable program code devices configured to cause the computer system to cause are responsive or additionally responsive to the computer readable program code devices configured to cause the computer system to compare.

There is disclosed a method of requesting information about a mobile subscriber telephone account, the method including the steps of: identifying cellular telephone service providers corresponding to a country code of the telephone number corresponding to the mobile subscriber telephone account; identifying an order of the cellular telephone service providers identified, in decreasing order of market share figures for each of said cellular telephone service providers; and querying the cellular telephone service providers for information about the mobile subscriber telephone account, responsive to at least part of the order identified.

There is disclosed a method of charging a cellular telephone account for goods or services purchased by a consumer from a merchant via an Internet, the method including the steps of: identifying a first country at which the consumer is connected to the Internet; identifying a second country corresponding to a telephone number of a cellular telephone of the consumer; identifying a third country corresponding to a location of the cellular telephone of the consumer; identifying at least one fourth country comprising at one selected from a location of the merchant and a destination for the goods or services; and charging the cellular telephone account responsive to the first country, the second country, the third country and at least one of the at least one fourth country.

There is disclosed a method of identifying a minimum balance that must be maintained by a cellular telephone service provider, including the steps of: identifying a balance of each of at least one account of the cellular telephone service provider; attempting to make a plurality of charges to the at least one account of the cellular telephone service provider; receiving a response to each of the plurality of charges, the response comprising an indication of whether the charge was accepted, at least one of the plurality of charges attempted receiving a response that such charge was accepted and at least one of the plurality of charges attempted receiving a response that such charge was not accepted; and identifying the minimum balance responsive to at least one charge that was accepted at least one charge that was rejected, the balance identified of at least one of the at least one account corresponding to at least one of the at least one the charge that was accepted, and the balance identified of at least one of the at least one account corresponding to at least one of the at least one the charge that was not accepted.

There is disclosed a method of charging a user for goods or services being purchased from a merchant, the method including the steps of: a) receiving from the merchant an amount of a charge for the goods or services and a telephone number of a mobile telephone; b) determining that an available balance, at a first time, of an account of a mobile telephone service provider corresponding to the telephone number received is insufficient to supply the amount of the charge; c) responsive to the determining step b), informing the user that the charge cannot be processed and requesting the user to increase the balance of the account; d) responsive to the determining step b), instructing the merchant to wait; e) after a period of time, determining that an available balance, at a second time, of the account of the mobile telephone service provider corresponding to the telephone number received is sufficient to supply the amount of the charge; f) causing at least the amount of the charge to be deducted from the account; and g) instructing the merchant to perform a goods or services action responsive to the causing step or the determining step e).

There is disclosed a method of charging a subscriber's mobile telephone account for two separate purchases of goods or services, including the steps of: receiving an amount of a first purchase at a first merchant at a first time, and an identifier of an account at a mobile telephone service provider; verifying that the account is either creditworthy or can support the amount of the first purchase; instructing the first merchant to perform a goods or services action responsive to the verifying step; receiving an amount of a second purchase at a second merchant at a second time, after the first time, and an identifier of the account at a mobile telephone service provider; and instructing the second merchant to perform a goods or services action without verifying that the account is either creditworthy or can support the amount of the second purchase.

There is disclosed a method of providing funds to a financial account from an account that is used to pay for a mobile telephone of a user, the method including the steps of: receiving a first amount resulting from an action of the user, providing a roaming charge to the account that is used to pay for the mobile telephone of the user, the roaming charge responsive to the first amount; and responsive to the first amount, providing funds to the financial account having at least an appearance to a merchant of at least one selected from a credit card account and a debit card account.

The first amount may be responsive to an amount provided by a merchant, and the two amounts may be the same or different.

The first amount may be responsive to an amount received from the user.

The method may additionally include the steps of retrieving an IMSI responsive to the receipt of the first amount; and comparing the IMSI retrieved to an IMSI previously retrieved; and the providing funds step may be additionally responsive to the comparing step There is disclosed a method of paying for a product other than a mobile device-related product or service other than a roaming service, the method including the steps of: receiving an amount from a merchant for the product or service, other than the roaming service; receiving a telephone number of a user who will be paying for the product or service; generating, to a mobile telephone account corresponding to the telephone number received, a roaming charge responsive to the amount; causing the merchant to perform a goods or services action; and causing the merchant to be provided funds responsive to the amount.

The method may have the step of checking to ensure the holder of a device corresponding to the mobile telephone account receives a message sent to the device; and the causing and providing steps may be responsive to the checking step.

The method may additionally have the step of checking to see if the mobile telephone account has been suspended or disabled; and the causing and providing steps may be responsive to the checking step.

The method may additionally have the steps of: determining whether the mobile telephone account is a prepaid account; and responsive to the mobile telephone account being determined to be a prepaid account, identifying whether a balance in the mobile telephone account is at least the amount; and the causing and providing steps may be responsive to the identifying step.

The method may include that the identifying step includes identifying whether the balance in the mobile telephone account is at least the amount and an additional amount corresponding to an operator corresponding to the prepaid account.

The method may additionally have the steps of: determining whether the mobile telephone account is a prepaid account; and responsive to the mobile telephone account being determined not to be a prepaid account, identifying whether a mobile telephone account is in good standing; and the causing and providing steps may additionally be responsive to the identifying step.

In the method, the goods or services action may include shipping goods or performing a physical service.

A system is disclosed for paying for a product other than a mobile device-related product or service other than a roaming service, the system including a user interface manager having an input for electronically receiving an amount from a merchant for the product or service, other than the roaming service and for receiving a telephone number of a user who will be paying for the product or service, the user interface manager for providing the amount and the telephone number at an output; a settlement manager having an input coupled to the user interface manager output for receiving the amount and the telephone number, the settlement manager for generating at an output, to a mobile telephone account corresponding to the telephone number received at the settlement manager input, a roaming charge responsive to the amount received at the settlement manager input and for causing via the settlement manager output the merchant to perform a goods or services action, and for crediting, via the settlement manager output, the merchant, responsive to the amount.

The system may additionally include a challenge response manager having an input coupled to the user interface manager for receiving the telephone number, the challenge response manager for checking via an input/output to ensure the holder of a device corresponding to the mobile telephone account receives a message sent to the device, and for providing at an output coupled to the user interface manager input an indication responsive to said holder corresponding to said amount; and in the system, the settlement manager may generate the roaming charge, cause the merchant to perform the goods or services action, and credit the merchant responsive additionally responsive to the indication.

The system may additionally include a fraud manager having an input coupled to the user input manager output for receiving the telephone number, the fraud manager for checking via an input/output to see if the mobile telephone account has been suspended or disabled and for providing at an output coupled to the user interface manager input an indication responsive to said account being suspended or disabled; and the settlement manager may generate the roaming charge, cause the merchant to perform the goods or services action, and credit the merchant, additionally responsive to the indication.

The system may additionally include: a prepaid determination manager having an input coupled to the user interface manager output for receiving the telephone number, the prepaid determination manager for determining via an input/output whether the mobile telephone account is a prepaid account and for providing at an output coupled to the user interface manager input a first indication responsive to said mobile telephone account being a prepaid account; and a balance sufficiency manager having an input coupled to the user interface manager output for receiving the telephone number and the amount responsive to the indication corresponding to the mobile telephone account being a prepaid account, the balance sufficiency manager for identifying via an input/output whether a balance in the mobile telephone account is at least the amount and for providing at an output coupled to the user interface manager input a second indication responsive to said mobile telephone account identified as being at least the amount; and, the settlement manager may generate the roaming charge, cause the merchant to perform the goods or services action, and credit the merchant, additionally responsive to the first and second indication.

In the system, the balance sufficiency manager may identify whether the balance in the mobile telephone account is at least the amount of the charge responsive to the balance in the mobile telephone account being at least the amount and an additional amount corresponding to an operator corresponding to the prepaid account.

The system may additionally include: a prepaid determination manager having an input coupled to the user interface manager output for receiving the telephone number, the prepaid determination manager for determining via an input/output whether the mobile telephone account is a prepaid account and for providing at an output coupled to the user interface manager input a first indication responsive to said mobile telephone account not being a prepaid account; and a creditworthy manager having an input coupled to the user interface manager output for receiving the telephone number and the amount responsive to the first indication corresponding to the mobile telephone account not being a prepaid account, the creditworthy manager for identifying via an input/output whether a subscriber of the mobile telephone account is worthy of credit for the amount and for providing at an output coupled to the user interface manager input a second indication responsive to said subscriber of mobile telephone account being worthy of credit for the amount; and the settlement manager may generate the roaming charge, cause the merchant to perform the goods or services action, and credit the merchant, additionally responsive to the first and second indication.

There is disclosed a computer program product including a computer useable medium having computer readable program code embodied therein for paying for a product or service other than a roaming service, the computer program product comprising computer readable program code devices configured to cause a computer system to: receive an amount from a merchant for the product or service, other than the roaming service; receive a telephone number of a user who will be paying for the product or service; generate, to a mobile telephone account corresponding to the telephone number received, a roaming charge responsive to the amount; cause the merchant to perform a goods or services action; and cause the merchant to be provided funds responsive to the amount.

The computer program product may additionally include computer readable program code devices configured to cause the computer system to check to ensure the holder of a device corresponding to the mobile telephone account receives a message sent to the mobile telephone corresponding to the telephone number; and the computer readable program code devices configured to cause the computer system to cause and provide may be responsive to the computer readable program code devices configured to cause the computer system to check.

The computer program product may additionally include computer readable program code devices configured to cause the computer system to check to see if the mobile telephone account has been suspended or disabled; and the computer readable program code devices configured to cause the computer system to cause and provide may be responsive to the computer readable program code devices configured to cause the computer system to check.

The computer program product may additionally include computer readable program code devices configured to cause the computer system to: determine whether the mobile telephone account is a prepaid account; and responsive to the mobile telephone account being determined to be a prepaid account, identify whether a balance in the mobile telephone account is at least the amount; and the computer readable program code devices configured to cause the computer system to cause and provide may be responsive to the computer readable program code devices configured to cause the computer system to identify.

In the computer program product, the computer readable program code devices configured to cause the computer system to identify may include computer readable program code devices configured to cause the computer system to identify whether the balance in the mobile telephone account is at least the amount and an additional amount corresponding to an operator corresponding to the prepaid account.

The computer program product may additionally include computer readable program code devices configured to cause the computer system to: determine whether the mobile telephone account is a prepaid account; and responsive to the mobile telephone account being determined not to be a prepaid account, identify whether a mobile telephone account is in good standing; and computer readable program code devices configured to cause and provide may be responsive to the computer readable program code devices configured to cause the computer system to identify.

In the computer program product, the goods or services action may include shipping goods or performing a physical service.

What is claimed is:

1. A method of executing computer instructions on at least one device in which the at least one device includes at least one processor and at least one memory, comprising:
   fetching computer instructions from the at least one memory of the at least one device for execution on the at least one processor of the at least one device;
   executing the fetched computer instructions on the at least one processor of the at least one device; and
   storing in the at least one memory of the at least one device any results of having executed the fetched computer instructions on the at least one processor of the at least one device;
   wherein the computer instructions to be executed comprise instructions to detect a suspicious transaction in connection with authentication of a mobile subscriber, wherein the executing the suspicious transaction detection computer instructions comprises:
      identifying a home country associated with a current mobile telephone number for the mobile subscriber;
      identifying one or more of the following: a country in which the mobile subscriber is using the internet; a country in which the mobile subscriber is roaming, is operating a current mobile telephone associated with the mobile subscriber's mobile provider account or is operating a current mobile telephone having a SIM card associated with the mobile subscriber's mobile account; a country in which a merchant for the transaction is located; and/or a country in which goods in the transaction, if any, are being shipped;
      comparing any countries identified; and
      scoring based at least in part on the result of country comparison(s) to detect the suspicious transaction.

2. The method of claim 1, wherein the executing the suspicious transaction detection computer instructions comprises: creating a database entry for an authentication database, including a mobile subscriber identifier associated with the mobile telephone number at the time of creation; and wherein the identifying the home country takes place via the current mobile telephone number.

3. The method of claim 2, wherein the mobile subscriber identifier associated with the mobile telephone number comprises an identifier of the SIM card.

4. The method of claim 3, wherein the SIM card identifier comprises an International Mobile Subscriber Identity (IMSI).

5. The method of claim 2, wherein the executing the suspicious transaction detection computer instructions further comprises: receiving a current merchant identifier before the comparing; and identifying the country for the merchant based at least in part on the merchant identifier.

6. The method of claim 2, wherein the executing the suspicious transaction detection computer instructions further comprises: identifying a current mobile telephone associated with the mobile subscriber's mobile account or a current mobile telephone having a SIM card associated with the mobile subscriber's mobile provider account via the current mobile subscriber identifier; and wherein the identifying the country in which the mobile subscriber is roaming and/or operating is at least in part via the current mobile telephone.

7. The method of claim 6, wherein the identifying the country in which the mobile subscriber is roaming or operating further comprises querying the mobile subscriber's mobile service provider.

8. The method of claim 1, wherein the executing the suspicious transaction detection computer instructions further comprises: identifying a current mobile telephone associated with the mobile subscriber's mobile account or a current mobile telephone having a SIM card associated with the mobile subscriber's mobile provider account via the current mobile subscriber identifier; and wherein the executing the suspicious transaction detection computer instructions further comprises: identifying a location where the mobile subscriber is operating is at least in part via a location of a cell tower in communication with the current mobile telephone.

9. The method of claim 8, wherein the identifying the location of the cell tower in communication with the current mobile telephone comprises querying the mobile subscriber's mobile service provider.

10. The method of claim 1, wherein the executing the suspicious transaction detection computer instructions further comprises: identifying a current mobile telephone associated with the mobile subscriber's mobile account or a current mobile telephone having a SIM card associated with the mobile subscriber's mobile provider account via the current mobile subscriber identifier; and wherein the executing the suspicious transaction detection computer instructions further comprises: the identifying the country in which the mobile subscriber is using the internet is at least in part via an IP address of the user.

11. The method of claim 10, wherein the identifying the country in which the mobile subscriber is using the internet comprises querying the mobile subscriber's mobile service provider.

12. The method of claim 1, wherein at least one of the countries is identified at least in part via electronic network communications.

13. The method of claim 12, wherein the electronic network communications comprise communications via the Internet.

14. The method of claim 1, wherein the at least one device comprises a server.

15. The method of claim 1, wherein the executing the suspicious transaction detection computer instructions further comprises: also receiving at least an amount for the transaction in connection with the authentication of the mobile subscriber.

16. The method of claim 1, wherein the transaction in connection with the authentication of the mobile subscriber comprises a purchase of goods so that a country in which the goods are shipped is able to be identified.

* * * * *